United States Patent
Araki et al.

(10) Patent No.: US 9,457,861 B2
(45) Date of Patent: Oct. 4, 2016

(54) INVERTED PENDULUM TYPE VEHICLE

(71) Applicant: HONDA MOTOR CO., LTD., Minato-Ku, Tokyo (JP)

(72) Inventors: Makoto Araki, Saitama (JP); Shinya Shirokura, Saitama (JP); Toru Takenaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 215 days.

(21) Appl. No.: 13/890,730

(22) Filed: May 9, 2013

(65) Prior Publication Data

US 2013/0299264 A1 Nov. 14, 2013

(30) Foreign Application Priority Data

May 14, 2012 (JP) ................. 2012-111064
May 31, 2012 (JP) ................. 2012-125436

(51) Int. Cl.
| B62K 3/00 | (2006.01) |
| B62K 1/00 | (2006.01) |
| B62H 1/12 | (2006.01) |
| B60B 19/00 | (2006.01) |
| B60B 19/12 | (2006.01) |

(52) U.S. Cl.
CPC ............. *B62K 3/007* (2013.01); *B62H 1/12* (2013.01); *B62K 1/00* (2013.01); *B60B 19/003* (2013.01); *B60B 19/12* (2013.01)

(58) Field of Classification Search
CPC ... B60B 19/12; B60B 19/003; B60B 19/006; B60S 9/00; B60S 9/02; B60R 3/02; B62D 61/12; B62D 61/02; B62D 33/077; B62D 33/067; B62D 33/063; B62H 7/00; A61G 5/043; A61G 3/0209; A61B 19/2203; B62K 3/007; B62K 1/00; B60L 15/20
See application file for complete search history.

(56) References Cited

U.S. PATENT DOCUMENTS

| 4,715,460 A * | 12/1987 | Smith ........................... 180/7.1 |
| 8,016,060 B2 * | 9/2011 | Miki et al. .................... 180/65.1 |
| 8,249,773 B2 * | 8/2012 | Kawada et al. ................ 701/36 |
| 8,346,441 B2 * | 1/2013 | Miki et al. ....................... 701/49 |
| 8,499,865 B2 * | 8/2013 | Takenaka et al. ............. 180/21 |
| 8,583,302 B2 | 11/2013 | Akimoto et al. |
| 2004/0102166 A1* | 5/2004 | Morita et al. .............. 455/152.1 |
| 2007/0296170 A1* | 12/2007 | Field et al. ............. 280/47.131 |

(Continued)

FOREIGN PATENT DOCUMENTS

| JP | H04201793 A | 7/1992 |
| JP | 2004129435 A | 4/2004 |

(Continued)

*Primary Examiner* — Joseph Rocca
*Assistant Examiner* — Daniel Yeagley
(74) *Attorney, Agent, or Firm* — Carrier Blackman & Associates, P.C.; Joseph P. Carrier; Jeffrey T. Gedeon

(57) ABSTRACT

An inverted pendulum type vehicle includes a control device for controlling a plurality of electric motors, and a portable device, such as a portable telephone, for displaying a center-of-gravity display point indicating the position of a center of gravity and outputting a command for moving the vehicle. The control device controls a first actuator device and a second actuator device so as to move the vehicle according to the command output from the portable device and the tilting of an occupant boarding member. Such inverted pendulum type vehicle makes it possible to learn how to steer the inverted pendulum type vehicle.

20 Claims, 17 Drawing Sheets

(56) References Cited

U.S. PATENT DOCUMENTS

| | | |
|---|---|---|
| 2008/0202837 A1* | 8/2008 | Macedo Ribeiro et al. . 180/236 |
| 2008/0295595 A1* | 12/2008 | Tacklind et al. ................. 73/462 |
| 2010/0030397 A1* | 2/2010 | Tachibana et al. ................ 701/1 |
| 2010/0114468 A1* | 5/2010 | Field et al. .................... 701/124 |
| 2010/0117426 A1* | 5/2010 | Strassman .................... 297/335 |
| 2010/0207564 A1* | 8/2010 | Robinson ..................... 318/490 |
| 2011/0067936 A1* | 3/2011 | Takenaka et al. ............... 180/21 |
| 2011/0172886 A1* | 7/2011 | Taira et al. ..................... 701/49 |
| 2012/0123647 A1* | 5/2012 | Doi et al. ........................ 701/49 |
| 2012/0168235 A1 | 7/2012 | Gomi et al. |
| 2012/0173042 A1* | 7/2012 | Takenaka et al. ................ 701/1 |

FOREIGN PATENT DOCUMENTS

| | | | |
|---|---|---|---|
| JP | 2005303936 A | | 10/2005 |
| JP | 2006087003 A | | 3/2006 |
| JP | 2008154815 A | | 7/2008 |
| JP | 2011068165 A | * | 4/2011 |
| JP | 2011068218 A | | 4/2011 |
| JP | 2011183908 A | * | 9/2011 |
| JP | 2012027424 A | | 2/2012 |
| JP | 2012053725 A | | 3/2012 |
| WO | 2011/033575 A1 | | 3/2011 |

* cited by examiner

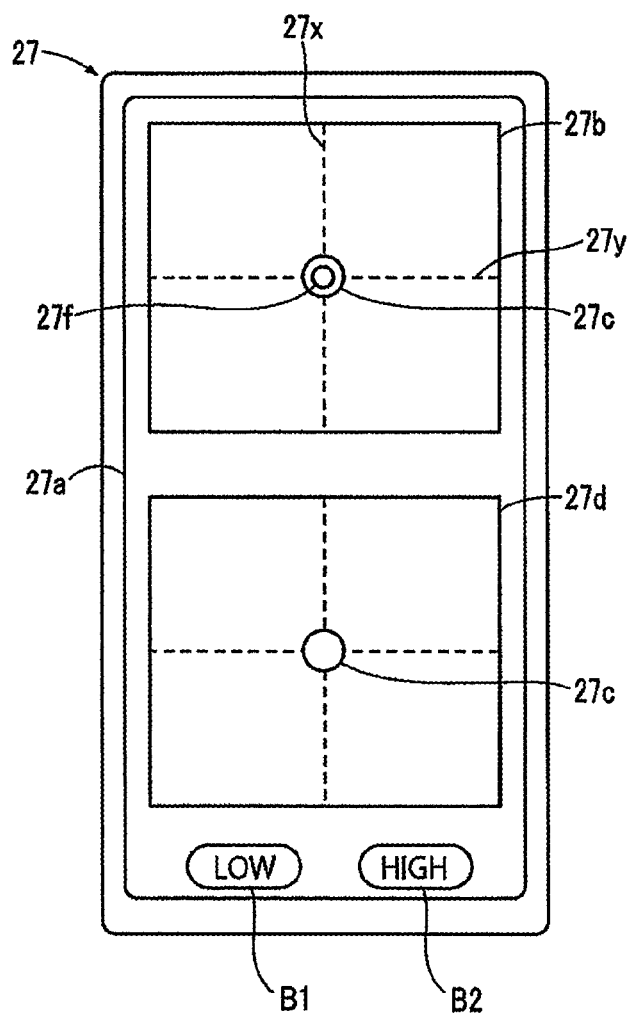

INVERTED PENDULUM TYPE VEHICLE

CROSS-REFERENCE TO RELATED APPLICATIONS

The present invention claims priority under 35 USC 119 based on Japanese patent applications Nos. 2012-111064, filed on May 14, 2012, and 2012-125436, filed on May 31, 2012. The entire subject matter of these priority documents, including specification claims and drawings thereof, is incorporated by reference herein.

BACKGROUND OF THE INVENTION

1. Field of the Invention

The present invention relates to an inverted pendulum type vehicle which is operable to move on a floor surface. More particularly, the present invention relates to an inverted pendulum type vehicle including a control device which controls actuator devices so as to move the vehicle according to command received from a portable device.

2. Description of the Background Art

There is a known inverted pendulum type vehicle in which an occupant boarding member capable of tilting with respect to a vertical direction is assembled to a base to which a moving operation part for moving on a floor surface and an actuator device for driving the moving operation part are assembled. An example of such inverted pendulum type vehicle is disclosed in the Patent Document PCT The inverted pendulum type vehicle controls the moving operation of the moving operation part in such a form as to move the fulcrum of an inverted pendulum in order to prevent the occupant boarding member on which an occupant is boarded from inclining to fall down.

In the Patent Document PCT Patent Publication No. WO2011/33575, for example, an inverted pendulum type vehicle has been proposed by the present applicant. Such inverted pendulum type vehicle can be moved on a floor surface in all directions including the forward-rearward direction and the left-right direction of an occupant by driving a (first) moving operation part according to the tilting of an occupant boarding member or the like.

Conventional inverted pendulum type vehicles, such as shown in Patent Document PCT Patent Publication No. WO2011/33575, require skillful steering techniques for operation of the vehicles. For example, the occupant generally needs to have skillful steering techniques to make a smooth turn, and depending on the movement of the occupant, there may occur an offset with respect to a direction intended by the occupant.

Accordingly, in order to enhance the stability or operability of turning behavior of the vehicle, a (second) moving operation part (which will hereinafter be referred to as an auxiliary moving operation part) that is coupled to the base such that an interval exists between the auxiliary moving operation part and the moving operation part present in the forward-rearward direction and which can move in all the directions including the forward-rearward direction and the left-right direction may be added to the vehicle, and control may be performed so as to impart a driving force to the auxiliary moving operation part so that the auxiliary moving operation part can move in at least the left-right direction.

In this case, in the left-right direction, the moving operation part and the auxiliary moving operation part are controlled such that the auxiliary moving operation part has a same velocity as the moving operation part, whereby the turning of the vehicle is suppressed. In addition, in the left-right direction, the moving operation part and the auxiliary moving operation part are controlled such that the auxiliary moving operation part has a different velocity from the moving operation part, whereby the vehicle can be turned smoothly. Thus configuring the auxiliary moving operation part improves the controllability of the inverted pendulum type vehicle.

However, even when the inverted pendulum type vehicle is thus configured, operations by the tilting of the occupant boarding member by body weight movement include difficult steering such as moving in the left-right direction without turning the vehicle, for example, and thus require skillful steering techniques of the occupant.

The present invention has been made in view of such a background. Accordingly, it is one of the objects of the present invention to provide an inverted pendulum type vehicle that makes it possible to learn how to steer the vehicle.

SUMMARY OF THE INVENTION

In order to achieve the above objects, the present invention provides an inverted pendulum type vehicle including at least a first moving operation unit operable to move on a floor surface, a first actuator device for driving the first moving operation unit, a base assembled with the first moving operation unit and the first actuator device, and an occupant boarding member assembled to the base so as to be tiltable with respect to a vertical direction, the first moving operation unit being configured to move in all directions including a forward-rearward direction and a left-right direction of an occupant boarded on the occupant boarding member by a driving force of the first actuator device, the inverted pendulum type vehicle including: a second moving operation unit coupled to the first moving operation unit or the base such that an interval is formed between the second moving operation unit and the first moving operation unit in the forward-rearward direction, and configured to move on the floor surface in all the directions; a second actuator device for generating a driving force for making at least the second moving operation unit move in the left-right direction; an operating device for outputting a command to move the inverted pendulum type vehicle according to an operation by the occupant boarded on the occupant boarding member; a notifying section for notifying information on movement of the occupant boarding member to the occupant boarded on the occupant boarding member; and a control device for controlling the first actuator device and the second actuator device so as to move the inverted pendulum type vehicle according to the command output from the operating device and tilting of the occupant boarding member.

According to the present invention, the notifying section notifies the information on movement of the occupant boarding member to the occupant. That is, even when the inverted pendulum type vehicle moves according to the operation of the operating device, the notifying section notifies the information on movement of the occupant boarding member to the occupant.

In general, movement by the operation of the operating device (hereinafter may be referred to as "operating device operation") is generally easy as compared with movement by the tilting of the occupant boarding member by body weight movement (operation for moving the inverted pendulum type vehicle by such tilting may hereinafter be referred to as "tilting operation"). The operating device operation therefore enables even an occupant not accustomed to the steering of the inverted pendulum type vehicle to steer the inverted pendulum type vehicle relatively easily as compared with the tilting operation.

For example, at a time of moving the inverted pendulum type vehicle in the left-right direction, the movement is made by the operating device operation when the occupant has a low degree of skillfulness (the "degree of skillfulness" in the present specification refers to a "degree of skillfulness in the steering of the inverted pendulum type vehicle"), and thus movement by the tilting operation is difficult. At this time, the notifying section notifies the "information on movement of the inverted pendulum type vehicle" at the time of moving in the left-right direction to the occupant. The occupant can thereby learn how to move the occupant boarding member to move in the left-right direction.

When thereafter moving the occupant boarding member by the tilting operation, it suffices for the occupant to steer the inverted pendulum type vehicle in such a manner as to coincide with the information notified at the time of the operating device operation. At this time, even if the tilting operation is not performed well, the "information on movement of the occupant boarding member" by the tilting operation is notified from the notifying section to the occupant. This enables a comparison to be made between the respective movements of the occupant boarding member by the tilting operation and the operating device operation. The occupant can also learn how to steer the inverted pendulum type vehicle by the comparison at this time.

Further, according to the present invention, the operation by the occupant boarded on the occupant boarding member includes a first operation for at least turning the inverted pendulum type vehicle and a second operation for at least moving the inverted pendulum type vehicle in the left-right direction. The operating device outputs a command for at least turning the inverted pendulum type vehicle in response to the first operation when the first operation is performed, and further outputs a command for at least moving the inverted pendulum type vehicle in the left-right direction in response to the second operation when the second operation is performed.

The occupant can thereby make both of turning and movement in the left-right direction by the operating device. Such operation enables various movements to be made by the operating device, and thus improves the controllability of the inverted pendulum type vehicle. Further, since movements of the occupant boarding members during the various movements are notified, the occupant can learn how to make these various movements by the tilting operation.

According to the present invention, when the first operation and the second operation are performed simultaneously, the operating device outputs the command corresponding to one of the operations, and does not output the command corresponding to the other operation. Only one of the command for turning the inverted pendulum type vehicle and the command for moving the inverted pendulum type vehicle in the left-right direction is thereby output.

As a case where such two operations are performed simultaneously, there may be, for example, a case where in the middle of performing one operation, the other operation is performed by erroneous operation. Accordingly, when preferential output of the command for the operation performed first is specified, for example, the interruption of the one operation by the erroneous operation can be prevented even when the other operation is performed by the erroneous operation in the middle of the one operation. Thus, the usability of the operating device can be improved.

Incidentally, depending on conditions in which the inverted pendulum type vehicle is used or the like, there may be a case where quick switching between the first operation and the second operation is desired. In the case where there is such a desire, by specifying preferential output of the command for the operation performed later, for example, quick switching to the other operation can be performed even when the other operation is performed earlier than an end of the one operation. Thus, the usability of the operating device can be improved.

As described above, when two different operations are performed simultaneously, the command corresponding to one of the operations is output as appropriate according to the conditions in which the inverted pendulum type vehicle is used or the like (a command outputting method is set as appropriate according to the conditions). Thereby the usability of the operating device can be improved.

According to the present invention, the control device controls the first actuator device and the second actuator device so as not to cause turning behavior of the inverted pendulum type vehicle while the second operation of the operating device is performed.

Thus, when the second operation of the operating device is performed, that is, the operating device is operated so as to move in the left-right direction at least, the first actuator device and the second actuator device are controlled so as not to cause the turning behavior of the inverted pendulum type vehicle. Thus, the inverted pendulum type vehicle can be translated without causing the turning behavior, and the controllability of the inverted pendulum type vehicle when the occupant does not desire the turning behavior of the inverted pendulum type vehicle can be improved.

In the present invention, the notifying section can be formed by a display device for displaying the information on movement of the occupant boarding member.

According to the present invention, the notifying section is provided to the operating device. Thus, in a case where the operating device is a display device, when the operating device is viewed to operate the operating device, the information on movement of the inverted pendulum type vehicle which information is notified from the notifying section can be viewed at the same time. Thus, the occupant does not need to greatly move a line of sight when alternately "viewing the operating device for operation" and "viewing the information on movement of the occupant boarding member." Therefore the convenience of the operating device and the notifying section can be improved.

According to the present invention, the operating device is configured to obtain a program for generating the command in response to the operation from an external server storing the program by communicating with the server. This facilitates an update to a new version of the program, for example. In addition, when the server is configured to store programs operating differently or the like, the occupant can obtain a program according to the preferences of the occupant. Thus, the convenience of the operating device can be improved.

According to the present invention, the operating device is configured to selectively perform processing in a plurality of kinds of forms for generating the command. The occupant may steer the inverted pendulum type vehicle under various conditions such for example as "conditions in which the inverted pendulum type vehicle is desired to respond instantly to the operation of the operating device as in the middle of moving or the like" and "conditions in which the inverted pendulum type vehicle is desired to stop if possible as when a still object is viewed." Thus, when the operating device is configured to be able to selectively perform processing in a plurality of kinds of forms for generating the command, the operating device can be adapted to be operated by the occupant comfortably under the above-described various conditions.

According to the present invention, the operating device is formed by a portable type terminal. In contrast to an operating device formed integrally with a vehicle, when the operating device is formed by a portable type terminal, the operating device can be disposed according to the preferences of the occupant when the operating device is operated. Thus the convenience of the operating device can be improved.

In the present invention, the information on movement of the occupant boarding member may be an angle of inclination of the inverted pendulum type vehicle or a center of gravity of a whole occupied vehicle including the inverted pendulum type vehicle and the occupant boarded on the occupant boarding member.

In the present invention, the operating device may be connected to the control device by wire, or may be connected to the control device by radio.

According to the present invention, when the operating device has continued being operated for a predetermined time period or more, the operating device starts to output the command to the control device, and notifies the occupant boarded on the occupant boarding member of the starting of the output of the command.

For example, in a case where the occupant erroneously touches the operating device by erroneous operation or the like, if the inverted pendulum type vehicle is moved as a result of the touch, the operability of the operating device cannot be said to be good for the occupant because the movement is not intended by the occupant.

In general, such erroneous operation is often momentary operation. Thus, when the operating device is configured to start to output the command to the control device when the operating device has continued being operated for a predetermined time or more, the movement of the inverted pendulum type vehicle by erroneous operation can often be prevented. In addition, when the starting of the output of the command is notified to the occupant, the occupant can recognize that the operating device operation is started. Thus, the convenience of the operating device can be improved.

In the present invention, the operating device can be configured to have additional predetermined functions other than a function of outputting the command, and when the predetermined function is enabled while the command is output according to the operation of the operating device, so that the operating device becomes unable to receive the operation, the operating device can stop the output of the command.

According to the present invention, the operating device includes a touch panel having an operating region to be touched, and when the operating region is changed from a state of not being touched to a state of being touched, and a point being touched is a predetermined position, the output of the command from the operating device to the control device is started, and the occupant boarded on the occupant boarding member is notified of the starting of the output of the command.

Thus, when the notification is made when a predetermined position is touched, conditions can be prevented in which the occupant presumes that the occupant is touching the predetermined position though the occupant is failing to touch the predetermined position by erroneous operation or the like. Therefore the operability of the operating device can be improved.

According to the present invention, the operating device includes a touch panel having an operating region to be operated by slide operation, and a reference point as a point changed from a state of not being touched to a state of being touched in the operating region to perform slide operation in the operating region being set as a reference, the operating device generates the command according to a change from the reference point to an operation point as a point after the slide operation is performed. When the operating device is thus configured, the slide operation can be started without the operating device being viewed, so that the operability of the operating device can be improved.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 15 is a diagram showing a display section when another form of steering program is executed.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

An inverted pendulum type vehicle according to an illustrative embodiment of the present invention will next be described.

Figure 1:
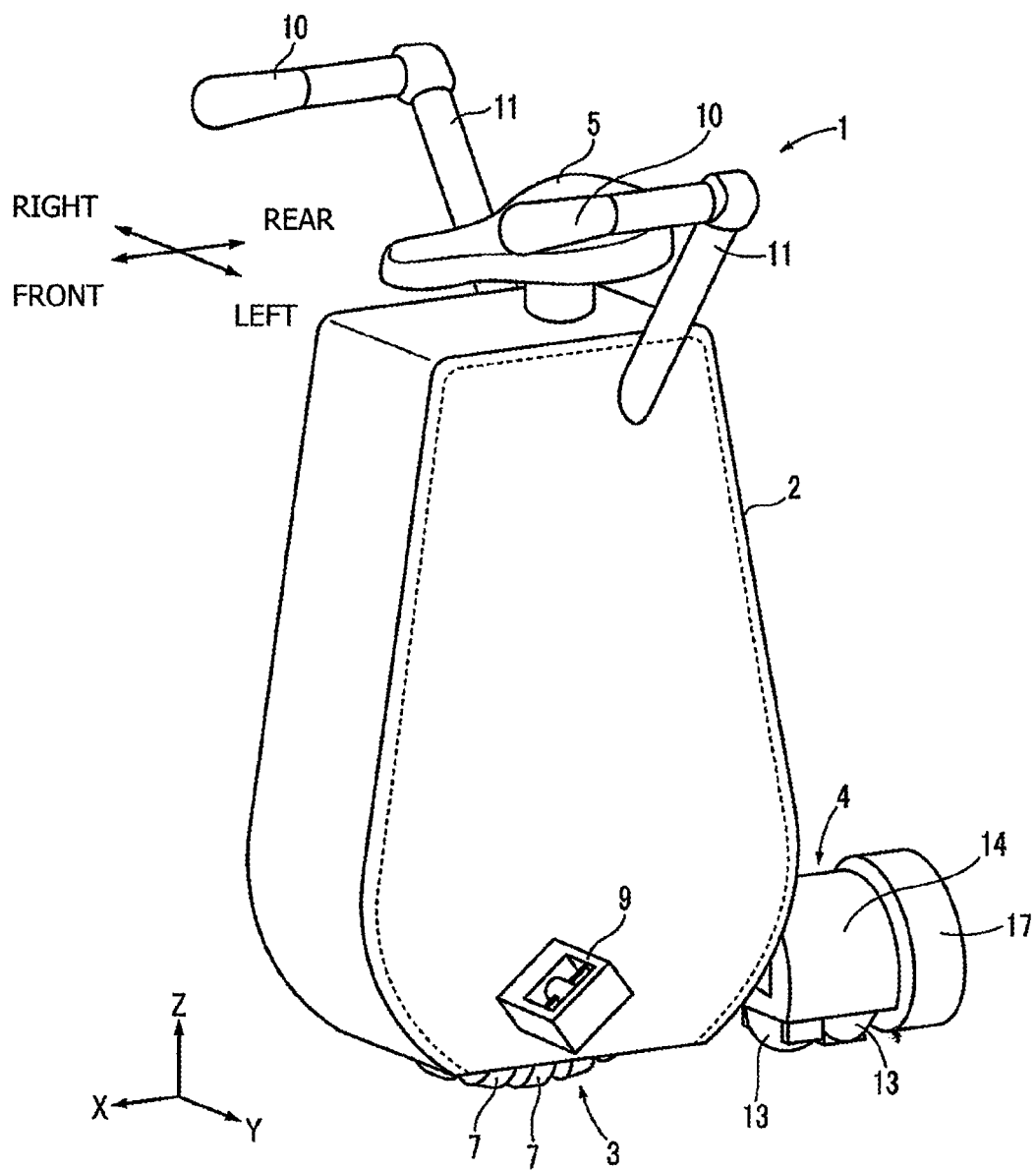
FIG. 1 is an external perspective view of an inverted pendulum type vehicle according to an illustrative embodiment of the present invention.
Figure 2:
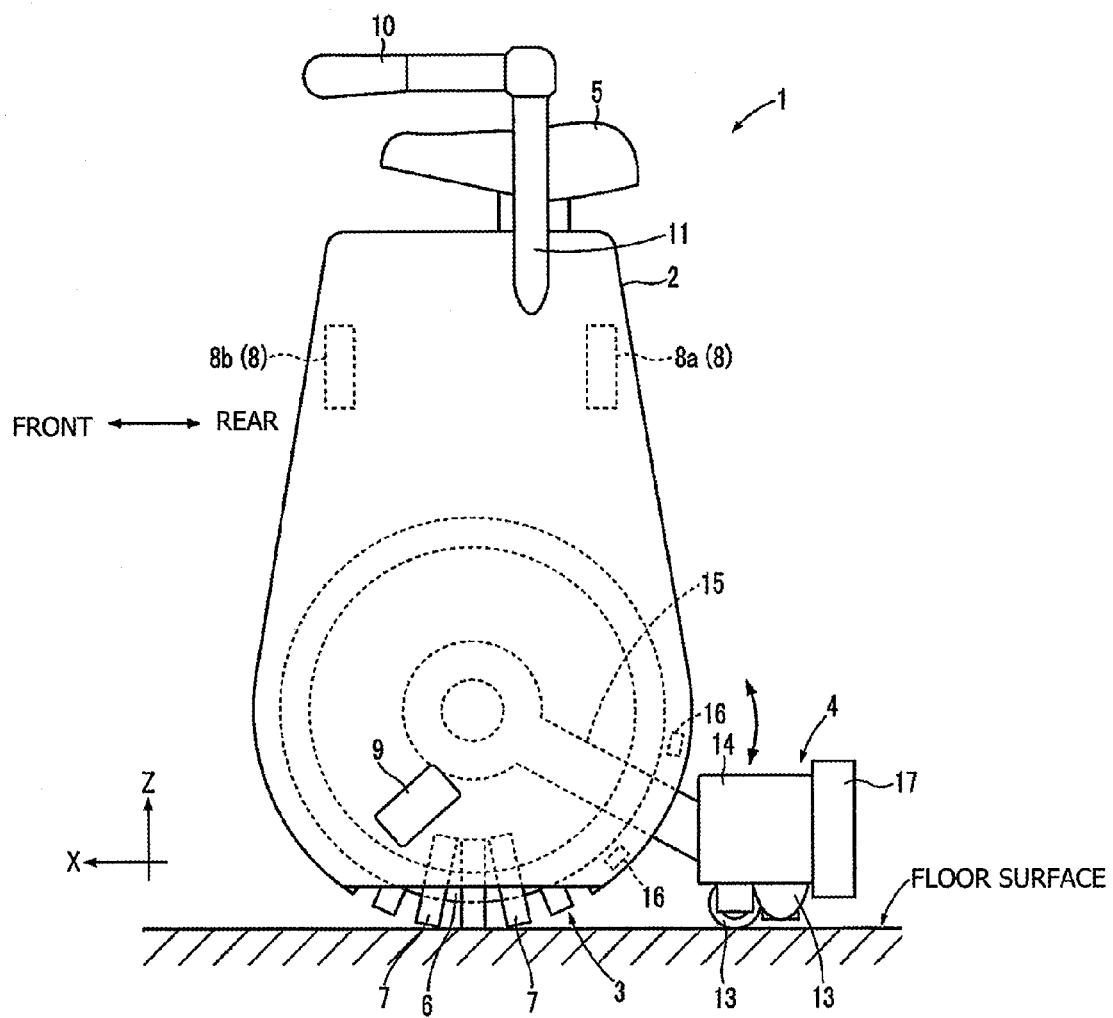
FIG. 2 is a side view of the inverted pendulum type vehicle according to the embodiment.

As shown in FIG. 1 and FIG. 2, the inverted pendulum type vehicle 1 (which inverted pendulum type vehicle 1 may hereinafter be referred to simply as a vehicle 1) according to the present embodiment includes a base 2, a first moving operation unit 3 and a second moving operation unit 4 movable on a floor surface, and an occupant boarding member 5 (also referred to as a seat 5) on which an occupant is boarded.

The first moving operation unit 3 includes a core body 6 in an annular shape shown in FIG. 2 (which core body will hereinafter be referred to as an annular core body 6) and a plurality of rollers 7 in an annular shape which rollers are mounted on the annular core body 6 in such a manner as to be arranged at equal angular intervals in the circumferential direction (direction about the axis) of the annular core body 6. The rollers 7 are externally inserted into the annular core body 6 with the axis of rotation of the rollers 7 directed to the circumferential direction of the annular core body 6. Then, the rollers 7 are rotatable integrally with the annular core body 6 about the axis of the annular core body 6, and are rotatable about the central axis of a cross section of the annular core body 6 (circumferential axis having the axis of the annular core body 6 as a center thereof).

The first moving operation unit 3 having the annular core body 6 and the plurality of rollers 7 is grounded on the floor surface via the rollers 7 (rollers 7 situated at the lower part of the annular core body 6) in a state of the axis of the annular core body 6 being directed in parallel with the floor surface. In this grounded state, the annular core body 6 is rotation-driven about the axis of the annular core body 6, so that the whole of the annular core body 6 and the rollers 7 rotates. The first moving operation unit 3 thereby moves on the floor surface in a direction orthogonal to the axis of the annular core body 6. In addition, in the grounded state, the rollers 7 are rotation-driven about the axis of rotation of the rollers 7. The first moving operation unit 3 thereby moves in the direction of the axis of the annular core body 6.

Further, the rotation driving of the annular core body 6 and the rotation driving of the rollers 7 move the first moving operation unit 3 in a direction inclined with respect to the direction orthogonal to the axis of the annular core body 6 and the direction of the axis of the annular core body 6. The first moving operation unit 3 can thereby move in all directions on the floor surface.

In the following description, as shown in FIG. 1 and FIG. 2, of the moving directions of the first moving operation unit 3, the direction orthogonal to the axis of the annular core body 6 will be set as an X-axis direction, the direction of the axis of the annular core body 6 will be set as a Y-axis direction, and a vertical direction will be set as a Z-axis direction. It may be noted that, a forward direction will be set as the positive direction of the X-axis, a left direction will be set as the positive direction of the Y-axis, and an upward direction will be set as the positive direction of the Z-axis.

The first moving operation unit 3 is assembled in the base 2. More specifically, the base 2 is provided so as to cover the periphery of parts of the first moving operation unit 3 excluding the underpart of the first moving operation unit 3 which is grounded on the floor surface. The annular core body 6 of the first moving operation unit 3 is supported by the base 2 so as to be rotatable about the axis of the annular core body 6.

The base 2 is tiltable about the axis of the annular core body 6 of the first moving operation unit 3 (about the Y-axis) with the axis of the annular core body 6 as a supporting point, and is tilted with respect to the floor surface together with the first moving operation unit 3 and is thus tiltable about the X-axis orthogonal to the axis of the annular core body 6 with the grounded part of the first moving operation unit 3 as a supporting point. The base 2 is therefore tiltable about the two axes with respect to the vertical direction.

In addition, as shown in FIG. 2, a first actuator device 8 generating a driving force for moving the first moving operation unit 3 is mounted within the base 2. The first actuator device 8 includes an electric motor 8a (first motor) as an actuator for rotation-driving the annular core body 6 and another electric motor 8b (second motor) as an actuator for rotation-driving the rollers 7. The electric motors 8a and 8b respectively give a rotation driving force to the annular core body 6 and the rollers 7 via a power transmission mechanism not shown in the figures. Incidentally, a known structure suffices for the power transmission mechanism.

It may be noted that, the first moving operation unit 3 may have a different structure from the above-described structure. For example, a structure proposed by the present applicant in PCT Patent Publication No. WO2008/132778 or PCT Patent Publication No. WO2008/132779 may be adopted as the structure of the first moving operation unit 3 and a driving system therefor.

In addition, the occupant boarding member 5 is assembled on the base 2. The occupant boarding member 5 includes a seat on which an occupant is to be seated, and is fixed to the upper end part of the base 2. An occupant can be seated on the occupant boarding member 5 with the forward-rearward direction of the occupant directed to the X-axis direction and with the left-right direction of the occupant directed to the Y-axis direction. In addition, since the occupant boarding member 5 (seat) is fixed to the base 2, the occupant boarding member 5 is tiltable with respect to the vertical direction integrally with the base 2.

A pair of footrest members 9 and 9 on which the occupant seated on the occupant boarding member 5 is to put the feet of the occupant and a pair of holding members 10 and 10 to be held by the occupant are further assembled on the base 2.

The footrest members 9 and 9 are projected from the lower parts of both sides of the base 2. It may be noted that, FIG. 1 and FIG. 2 do not show the footrest member 9 on one side (right side).

The holding members 10 and 10 are in the shape of a bar disposed so as to extend in the X-axis direction (forward-rearward direction) on both sides of the occupant boarding member 5. The holding members 10 and 10 are each fixed to the base 2 via a rod 11 extended from the base 2.

The second moving operation unit 4 in the present embodiment is formed by a so-called omniwheel. The omniwheel as the second moving operation unit 4 has a known structure including a pair of coaxial annular core bodies (not shown) and a plurality of rollers 13 in the shape of a barrel which rollers are externally inserted into each of the annular core bodies so as to be rotatable with the axis of rotation of the rollers 13 directed to the circumferential direction of the annular core bodies.

The second moving operation unit 4 is disposed in the rear of the first moving operation unit 3 with the axis of the pair of annular core bodies directed to the X-axis direction (forward-rearward direction), and is grounded on the floor surface via the rollers 13.

The rollers 13 on one side of the pair of annular core bodies and the rollers 13 on the other side are disposed so as to be out of phase with each other in the circumferential direction of the annular core bodies, so that one of the rollers 13 on one side of the pair of annular core bodies and the rollers 13 on the other side is grounded on the floor surface at a time of rotation of the pair of annular core bodies.

The second moving operation unit 4 formed by omniwheel is coupled to the base 2. More specifically, the second moving operation unit 4 has a casing 14 covering a part on the upper side of the omniwheel (whole of the pair of annular core bodies and the plurality of rollers 13). The pair of annular core bodies of the omniwheel is rotatably supported by the casing 14 so as to be rotatable about the axis of the pair of annular core bodies. Further, an arm 15 extended from the casing 14 to the side of the base 2 is rotatably supported by the base 2 so as to be swingable about the axis of the annular core body 6 of the first moving operation unit 3. The second moving operation unit 4 is thereby coupled to the base 2 via the arm 15.

The second moving operation unit 4 is swingable about the axis of the annular core body 6 of the first moving operation unit 3 with respect to the base 2 due to the swinging of the arm 15. Thereby the occupant boarding member 5 can be tilted about the Y-axis together with the base 2 while both of the first moving operation unit 3 and the second moving operation unit 4 remain grounded.

The arm 15 may be rotatably supported by the axial part of the annular core body 6 of the first moving operation unit 3, and the second moving operation unit 4 may be coupled to the first moving operation unit 3 via the arm 15.

In addition, a pair of stoppers 16 and 16 for limiting the swinging range of the arm 15 is provided in the base 2 so that the arm 15 can swing within the range between the stoppers 16 and 16. Thereby, the swinging range of the second moving operation unit 4 about the axis of the annular core body 6 of the first moving operation unit 3 and, in turn, the titling range of the base 2 and the occupant boarding member 5 about the X-axis are limited, and the base 2 and the occupant boarding member 5 are prevented from being tilted to the rear side of the occupant too much.

The second moving operation unit 4 may be biased by a spring so as to be pressed against the floor surface.

The second moving operation unit 4 can move on the floor surface in all directions including the X-axis direction and the Y-axis direction, as with the first moving operation unit 3, by one or both of the rotation of the pair of annular core bodies and the rotation of the rollers 13 as described above. Specifically, the second moving operation unit 4 can move in the Y-axis direction (left-right direction) by the rotation of the annular core bodies, and can move in the X-axis direction (forward-rearward direction) by the rotation of the rollers 13.

In addition, an electric motor 17 as a second actuator device for driving the second moving operation unit 4 is attached to the casing 14 of the second moving operation unit 4. This electric motor 17 is coupled to the pair of annular core bodies of the second moving operation unit 4 so as to rotation-drive the pair of annular core bodies.

Hence, according to the present embodiment, the second moving operation unit 4 moves in the X-axis direction in a driven manner so as to follow the movement of the first moving operation unit 3 in the X-axis direction, and the second moving operation unit 4 moves in the Y-axis direction by the rotation driving of the pair of annular core bodies of the second moving operation unit 4 by the electric motor 17.

To supplement the description, the second moving operation unit 4 may have a similar structure to that of the first moving operation unit 3.

The above-described constitution is the mechanistic constitution of the vehicle 1 according to the illustrative embodiment of the present invention.

Figure 3:
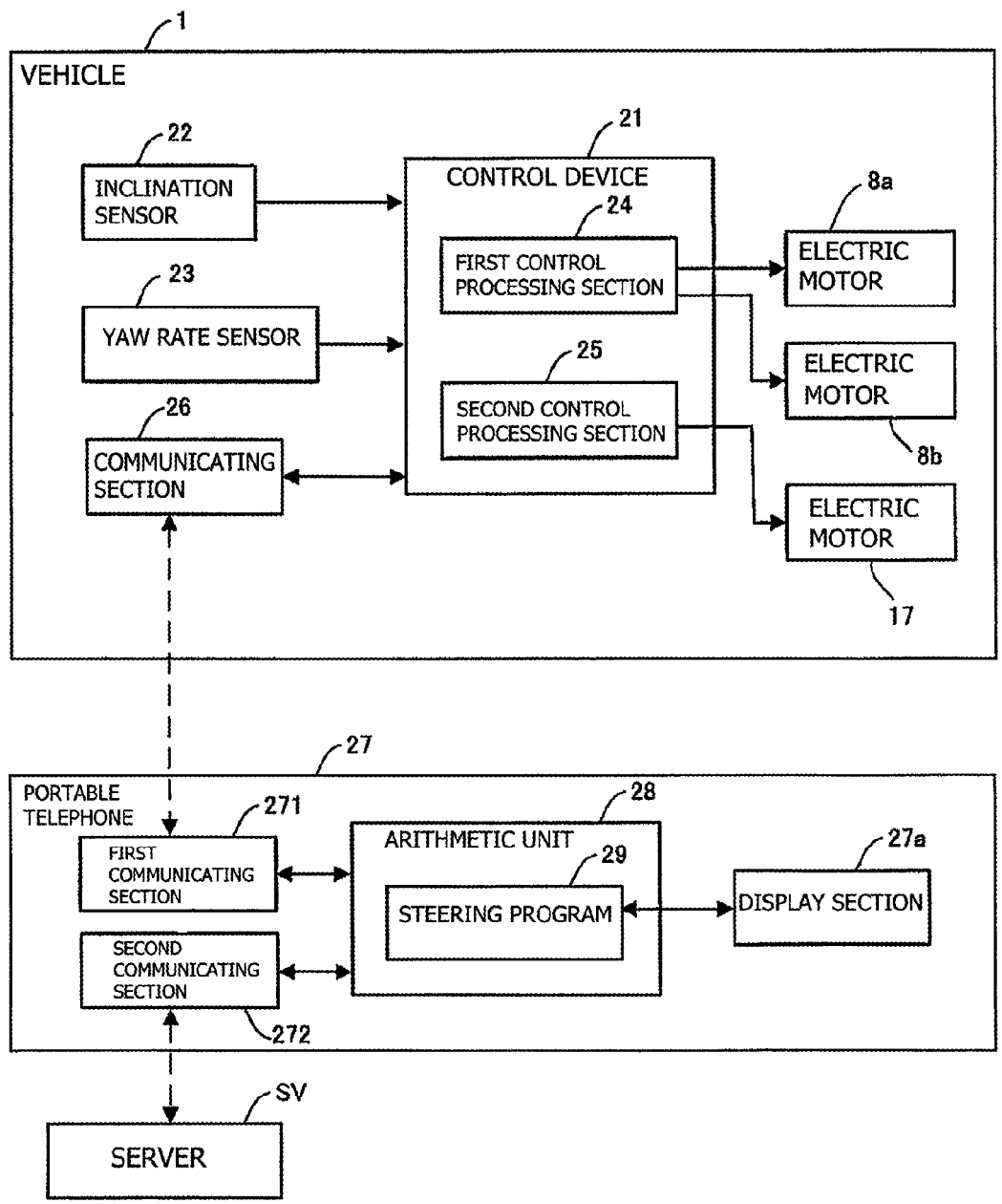
FIG. 3 is a block diagram showing a configuration for the control of the inverted pendulum type vehicle and the control of a portable telephone according to the embodiment.

Although not shown in FIG. 1 nor FIG. 2, as a constitution for controlling the operation of the vehicle 1 (controlling the operation of the first moving operation unit 3 and the second moving operation unit 4), as shown in FIG. 3, the base 2 of the vehicle 1 according to the present embodiment includes: a control device 21 formed by an electronic circuit unit including a CPU, a RAM, a ROM, and the like; an inclination sensor 22 for measuring the angle of inclination of the occupant boarding member 5 (angle of inclination of the base 2) with respect to the vertical direction; a yaw rate sensor 23 for measuring the angular velocity of the vehicle 1 about a yaw axis; and a communicating section 26 for radio communication with a portable telephone 27 to be described later by Bluetooth (registered trademark) or the like.

Detection signals of the inclination sensor 22 and the yaw rate sensor 23 and output of the communicating section 26 are input to the control device 21.

The control device 21 may be formed by a plurality of electronic circuit units capable of communicating with each other.

The inclination sensor 22 is for example formed by an acceleration sensor and an angular velocity sensor such as a gyro sensor or the like. The control device 21 obtains the measured value of the angle of inclination of the occupant boarding member 5 (in other words, the angle of inclination of the base 2) from detection signals of the acceleration sensor and the angular velocity sensor by using a known method. For example, a method proposed by the present applicant in Japanese Patent No. 4181113, can be adopted.

The angle of inclination of the occupant boarding member 5 (or the angle of inclination of the base 2) in the present embodiment is more specifically an angle of inclination (a set of an angle of inclination in the direction about the X-axis and an angle of inclination in the direction about the Y-axis) when the attitude of the occupant boarding member 5 (or the base 2) in a state in which the center of gravity of the whole including the vehicle 1 and the occupant boarded on the occupant boarding member 5 in a predetermined position (normal position) is situated directly above the grounded part of the first moving operation unit 3 (above in the vertical direction) is set as a reference (zero).

In addition, the yaw rate sensor 23 includes an angular velocity sensor such as a gyro sensor or the like. The control device 21 obtains the measured value of the angular velocity of the vehicle 1 about the yaw axis on the basis of the detection signal of the yaw rate sensor 23.

As will be described later, data indicating a command generated by a steering program 29 of the portable telephone 27 on which a predetermined operation has been performed is transmitted to the communicating section 26 by radio communication. The transmitted data includes not only the data indicating the command but also information given to perform the radio communication (which information is for example header information necessary for a communication protocol, an error correction code, and the like). The communicating section 26 outputs the data after these pieces of given information are deleted (that is, the command) to the control device 21.

The portable device 27, such as a portable telephone 27 as an operating device will next be described with reference to FIG. 4.

The portable telephone 27 includes a display section 27a formed by a touch panel display, which is a display device allowing touch operation on an entire surface. The display section 27a is configured to be able to detect the coordinates of a touched point. The portable telephone 27 also includes an arithmetic unit 28 formed by an electronic circuit unit including a CPU, a RAM, a ROM, and the like. The portable telephone 27 further includes a first communicating section 271 for radio communication with the communicating section 26 of the vehicle 1 and a second communicating section 272 for radio communication with an external server SV (not shown in FIG. 4).

The arithmetic unit 28 performs predetermined arithmetic processing according to a predetermined program stored in a storage device (not shown) within the arithmetic unit 28. The storage device stores a plurality of programs. Stored among the plurality of program is a program 29 (hereinafter also referred to as a "steering program") for outputting a command for steering the vehicle 1 to the control device 21 of the vehicle 1.

Figure 4:
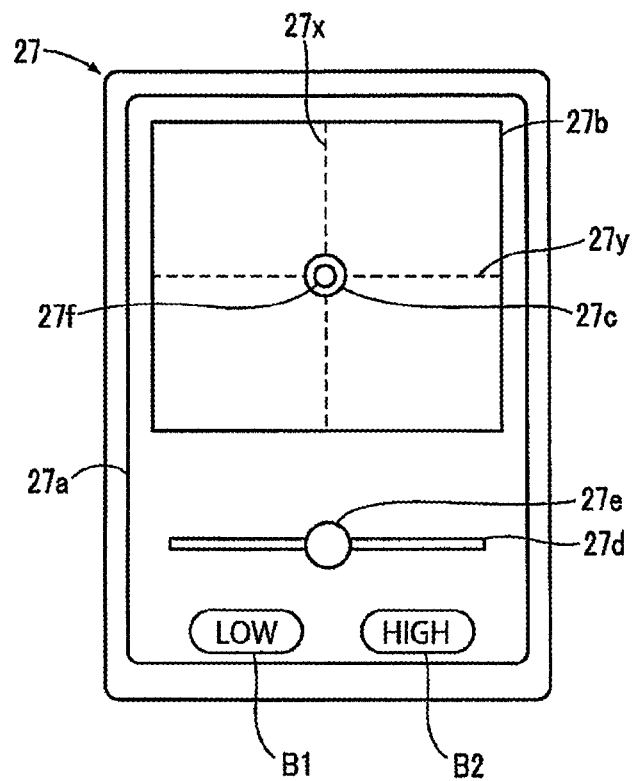
FIG. 4 is a diagram showing a display section when an arithmetic unit of the portable telephone according to the embodiment is executing a steering program.

FIG. 4 shows the display section 27a when the steering program 29 is executed by the arithmetic unit 28 of the portable telephone 27. The display section 27a displays a first operating region 27b disposed in substantially the shape of a square, a second operating region 27d in the shape of a bar long in the horizontal direction of FIG. 4, a low-speed mode button B1, and a high-speed mode button B2.

A first guide line 27x along the vertical direction of FIG. 4 and a second guide line 27y along the horizontal direction of FIG. 4 are displayed within the first operating region 27b. In addition, a first pointer 27c is displayed at an intersection of the first guide line 27x and the second guide line 27y. A second pointer 27e is displayed in the central part of the second operating region 27d.

The steering program 29 detects an amount of slide when a slide operation is performed in every direction including the vertical direction and the horizontal direction after the first pointer 27c within the first operating region 27b is touched. This amount of slide is obtained by detecting the coordinates of a point touched after the slide operation (which point will hereinafter be referred to as an "operation point") and calculating a distance between the coordinates of the operation point and the coordinates (coordinates specified in advance) of the first pointer 27c.

At this time, the steering program 29 outputs an operation signal corresponding to an amount of slide in the vertical direction of the first pointer 27c as a command (which command will hereinafter be referred to as a "first vertical slide command") Js_x for moving the vehicle 1 forward or rearward, and outputs an operation signal corresponding to an amount of slide in the horizontal direction of the first pointer 27c as a command (which command is a turn command, and will hereinafter be referred to as a "first horizontal slide command") Js_y for turning the vehicle 1 clockwise or counterclockwise. Incidentally, in the present embodiment, as for the amount of slide in the vertical direction of the first pointer 27c, an amount of slide in an upward direction is positive, and an amount of slide in a downward direction is negative. In addition, as for the amount of slide in the horizontal direction of the first pointer 27c, an amount of slide in a left direction is positive, and an amount of slide in a right direction is negative.

The steering program 29 detects an amount of slide when the second pointer 27e on the second operating region 27d is slid in the horizontal direction after being touched. This amount of slide is obtained by calculating a distance between the coordinates of the operation point and the coordinates (coordinates specified in advance) of the second pointer 27e. At this time, the steering program 29 outputs an operation signal corresponding to an amount of slide in the horizontal direction of the second pointer 27e as a command (which command will hereinafter be referred to as a "second horizontal slide command") Js2_y for moving the vehicle 1 to the left or to the right. In the present embodiment, as for the amount of slide in the horizontal direction of the second pointer 27e, an amount of slide in the left direction is positive, and an amount of slide in the right direction is negative.

A predetermined range of sufficiently minute amounts of slide in the vertical direction of the first pointer 27c, a predetermined range of sufficiently minute amounts of slide in the horizontal direction of the first pointer 27c, and a predetermined range of sufficiently minute amounts of slide in the horizontal direction of the second pointer 27e may each be set to be a dead zone so that the slide commands Js_x, Js_y, and Js2_y are set to zero for amounts of slide within the respective dead zones.

The display section 27a is formed by a touch panel allowing multiple touches. Therefore, points in two regions, that is, a point in the first operating region 27b and a point in the second operating region 27d may be touched simultaneously. In the present embodiment, when a point in the first operating region 27b and a point in the second operating region 27d are touched simultaneously, the steering program 29 determines that the touching of only an operating region touched first is valid, and determines that the touching of an operating region touched later is invalid.

For example, when the first pointer 27c in the first operating region 27b is touched, and the second pointer 27e in the second operating region 27d is touched while the touching of the first pointer 27c is not released, the touching of the second pointer 27e is invalid even when the second pointer 27e is touched. Even if the second pointer 27e is slid in the horizontal direction within the second operating region 27d in this state, the sliding operation is invalid.

Thus, even when a point in another operating region is touched or slid by an erroneous operation while a point in one operating region is being slid, the interruption of the operation in the one operating region, for example, can be prevented.

Incidentally, when a point in the first operating region 27b and a point in the second operating region 27d are touched simultaneously, the steering program 29 may be configured to determine that the touching of an operating region touched later is valid, and determine that the touching of an operating region touched previously is invalid. In this case, as a case where two operations are performed simultaneously, there may be another case where another operation is performed earlier than an end of one operation when quick switching from the one operation to the other operation is desired to be performed, for example. Accordingly, when preferential output of a command for the later operation is specified, for example, quick switching to the other operation can be performed even when the other operation is performed earlier than an end of the one operation.

The configuration of the steering program 29 as described above corresponds to "when the first operation and the second operation are performed simultaneously, the operating device outputs a command corresponding to one of the operations, and does not output a command corresponding to the other operation" in the present invention.

The low-speed mode button B1 is a virtual button for changing the moving mode of the vehicle 1 to a low-speed mode to be described later. When a region in which the button is displayed is touched, the moving mode is set to the low-speed mode. The high-speed mode button B2 is a virtual button for changing the moving mode of the vehicle 1 to a high-speed mode to be described later. When a region in which the button is displayed is touched, the moving mode is set to the high-speed mode.

Next described is a function for mutual communication between the steering program 29 executed by the above-described portable telephone 27 and the vehicle 1.

As described above, the steering program 29 of the portable telephone 27 is configured to perform radio communication with the vehicle 1 via the first communicating section 271. While performing radio communication with the vehicle 1, the steering program 29 transmits, to the vehicle 1, commands (Js_x, Js_y, and Js2_y) obtained from the operations of the pointers 27c and 27e in the first operating region 27b and the second operating region 27d, and obtains vehicle information from the vehicle 1. As will be described later in detail, the vehicle information in this case is information on the position (estimated value Ofst_estm_xy) of the center of gravity of the whole including the vehicle 1 and an occupant boarded on the occupant boarding member 5.

In the present embodiment, the steering program 29 obtains the position (estimated value Ofst_estm_xy) of the center of gravity of the whole as the vehicle information. The steering program 29 then displays a center-of-gravity display point 27f in the first operating region 27b as a point indicating the obtained position of the center of gravity of the whole on the first operating region 27b (details will be described later).

A process of the arithmetic unit 28 which process is performed by the steering program 29 of the portable telephone 27 when the portable telephone 27 communicates with the vehicle 1 will first be described with reference to FIG. 5.

First, in first step ST1, whether radio connection with the vehicle 1 is established is determined. When radio connection with the vehicle 1 is not established, the process proceeds to step ST2, where radio communication is started. In this step, in a case of Bluetooth, pairing with the vehicle 1 is attempted. After the radio connection is established, data transmitted from the vehicle side is received in predetermined cycles. The received data includes not only vehicle information but also information given to perform the radio communication (which information is for example header information necessary for a communication protocol, an error correction code, and the like). The data after these pieces of given information are deleted by the first communicating section 271 (that is, the vehicle information) is passed to the steering program 29. After the process of step ST2 is ended, the process returns to step ST1.

After the radio connection with the vehicle 1 is established, the process proceeds to step ST3, where the received vehicle information, that is, the position (estimated value Ofst_estm_xy) of the center of gravity of the whole and the like is displayed (notified) for the occupant in a predetermined region of the display section 27a (details will be described later). Incidentally, the notification of the vehicle information is not limited only to display, but may be performed by producing sound or generating vibration, for example.

After the process of step ST3 is ended, the process proceeds to step ST4, where whether one of the first pointer 27c and the second pointer 27e is touched is determined.

When it is determined that none of the pointers 27c and 27e is not touched, the process returns to step ST1. When it is determined that one of the pointers 27c and 27e is touched, the process proceeds to step ST5, where whether the duration of the touch has exceeded a predetermined time is determined. Specifically, when a change is made from a state in which none of the pointers 27c and 27e is touched to a state in which one of the pointers 27c and 27e is touched as a result of the determination in step ST4, the steering program 29 starts a timer for measuring time.

In step ST5, it is determined that the predetermined time has passed when the measured value of the started timer is a predetermined value or more, and it is determined that the predetermined time has not passed when the measured value of the started timer is less than the predetermined value. Incidentally, when it is determined as a result of the determination in step ST4 that none of the pointers 27c and 27e is touched, the value of the timer is reset to zero.

When it is determined in step ST4 that one of the pointers 27c and 27e is touched, the occupant is notified that one of the pointers 27c and 27e is touched. The notification at this time is realized by vibrating the casing of the portable telephone. Incidentally, the occupant may be notified by producing sound or changing the display of the display section 27a, for example.

As described above, when a slide operation is performed after one of the pointers 27c and 27e is touched, a command is transmitted from the portable telephone 27 to the vehicle 1. In other words, when none of the pointers 27c and 27e is touched, no command is transmitted from the portable telephone 27 to the vehicle 1.

Thus, when the occupant performs a slide operation without touching any of the pointers 27c and 27e, no command is actually transmitted to the vehicle 1 even though the occupant thinks that the occupant is performing the slide operation, and the vehicle 1 is not moved by the operation on the portable telephone 27. Accordingly, when the occupant is notified that one of the pointers 27c and 27e is touched, a situation can be prevented in which the occupant presumes that the occupant is performing such an operation though the occupant is failing to perform the operation.

The pointers 27c and 27e correspond to the "predetermined position" in the present invention. "When it is determined that one of the pointers 27c and 27e is touched, the occupant is notified that one of the pointers 27c and 27e is touched" in step ST4 corresponds to "the operating device includes a touch panel having an operating region to be touched, and when the operating region is changed from a state of not being touched to a state of being touched, and a point being touched is a predetermined position, the output of the command from the operating device to the control device is started, and the occupant boarded on the occupant boarding member is notified of the starting of the output of the command" in the present invention.

When it is determined in step ST5 that the predetermined time has not passed, the process returns to step ST1. When it is determined in step ST5 that the predetermined time has passed, the process proceeds to step ST6. Then, in step ST6, the steering program 29 notifies the occupant that reception of an operation is started. The notification at this time is realized by vibrating the casing of the portable telephone, for example. The occupant may be notified by producing sound or changing the display of the display section 27*a*, for example. The process of step ST6 enables the occupant to recognize that operation of the vehicle 1 is started.

The predetermined time in step ST5 is set to a time such that the inverted pendulum type vehicle can be prevented from being moved when one of the pointers 27*c* and 27*e* on the display section 27*a* is erroneously touched by an erroneous operation or the like. That is, the steering program 29 is configured not to respond immediately even when one of the pointers 27*c* and 27*e* is touched, and configured to be able to distinguish whether the touch is performed with an intention of really performing an operation or by an erroneous operation. This can prevent the steering program 29 from generating a command to move the vehicle 1 in response to a touch considered to be an erroneous operation.

The process of steps ST4 to ST6 corresponds to "when the operating device has continued being operated for a predetermined time or more, the operating device starts to output the command to the control device, and notifies the occupant boarded on the occupant boarding member of the starting of the output of the command" in the present invention.

After the process of step ST6 is ended, the process proceeds to step ST7, where whether the touch is released is determined. When it is determined that the touch is released, the process returns to step ST1. When it is determined that the touch is not released, the process proceeds to step ST8.

In step ST8, whether a slide operation is performed is determined. When it is determined that no slide operation is performed, the process proceeds to step ST9, where a previous operation signal is transmitted to the vehicle 1. The process next proceeds to step ST10, where as in step ST3, vehicle information is received from the vehicle 1, and the vehicle information is notified to the occupant.

When it is determined in step ST8 that a slide operation is performed, the process proceeds to step ST11, where an operation signal obtained by the slide operation is transmitted to the vehicle 1. The process then proceeds to step ST12, where the pointer determined to be touched in step ST4 is moved and displayed at a position to which the pointer has been moved by the slide operation (that is, the point being touched at a present time). The process then proceeds to step ST13, where as in step ST3 and step ST10, vehicle information is received from the vehicle 1, and the vehicle information is notified to the occupant.

The process next proceeds to step ST14, where whether an interrupt has occurred in the portable telephone 27 is determined. An interrupt in the portable telephone 27 in this case is for example an incoming telephone call. In this case, an operation for the steering program 29 cannot be received, with switching performed from display by the steering program 29 to display for the incoming call, for example.

Thus, when it is determined in step ST14 that an interrupt has occurred in the portable telephone 27, the process proceeds to step ST15, where the state of radio connection with the vehicle 1 is ended, and the transmission of the command to the vehicle 1 is stopped. The process then proceeds to step ST16, where the occupant is notified that the transmission of the command to the vehicle 1 is stopped in step ST15. The present flowchart is then ended.

The process of determining that an interrupt has occurred in step ST14 and stopping the transmission of the command to the vehicle 1 in step ST15 corresponds to "when the predetermined function is enabled while the command is output according to operation of the operating device, so that the operating device becomes unable to receive the operation, the operating device stops the output of the command" in the present invention.

When it is determined in step ST14 that no interrupt has occurred, the process returns to step ST7.

The above is details of the process of the arithmetic unit 28 which process is performed by the steering program 29 of the portable telephone 27 when the portable telephone 27 communicates with the vehicle 1.

Figure 6:
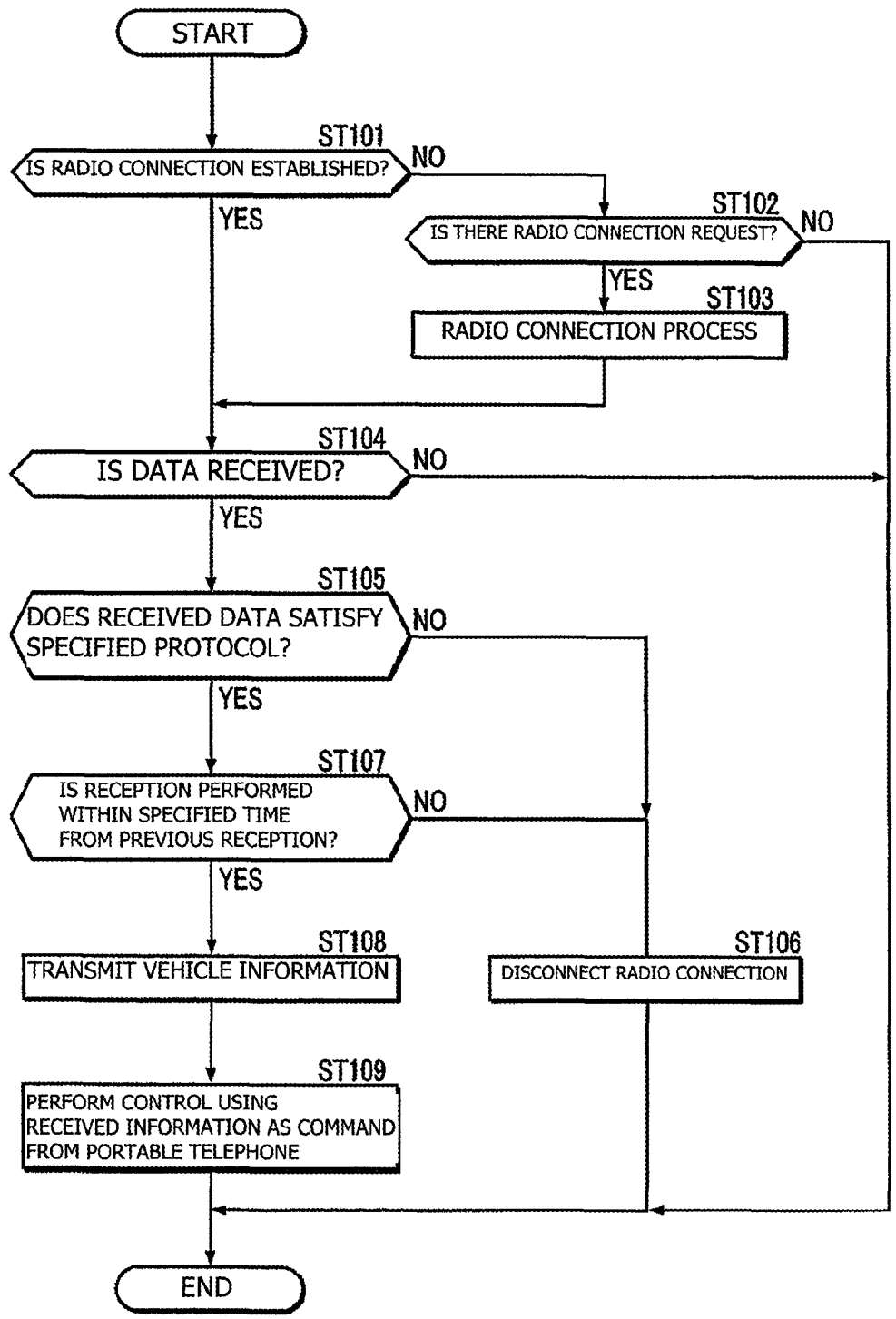
FIG. 6 is a flowchart of a process when a vehicle according to the embodiment communicates with the portable telephone.

A process performed by the control device 21 of the vehicle 1 when the vehicle 1 communicates with the portable telephone 27 will next be described with reference to FIG. 6.

First, in first step ST101, whether radio connection with the portable telephone 27 is established is determined. When the radio connection is not established, the process proceeds to step ST102, where whether there is a radio connection request from the portable telephone 27 is determined. When no radio connection request has arrived, the present flowchart is ended. When a radio connection request has arrived, the process proceeds to step ST103, where a radio connection process is performed.

When the radio connection is established in step ST101, or when the process of step ST103 is ended, the vehicle 1 is connected to the portable telephone 27 by radio. Thus, the process proceeds to step ST104, where whether data transmitted from the portable telephone 27 is received is determined. When no data is received, the present flowchart is ended. When data is received, the process proceeds to step ST105, where whether the received data satisfies a specified protocol is determined. The specified protocol in this case means header information and the like given to perform communication. When these pieces of given information are not specified data, the received data may be unauthorized data transmitted from another person (another portable telephone terminal than the portable telephone terminal with which communication has been established first) by spoofing, interference, or the like. Accordingly, it is determined that the received data is obtained by unauthorized communication, and the process proceeds to step ST106, where the radio connection is disconnected. The present flowchart is then ended.

When the received data satisfies the specified protocol, the process proceeds to step ST107, where whether an elapsed time from "reception before the reception in question" to the "reception in question" is within a time specified in advance is determined. This determination is to improve the reliability of data obtained by radio communication. When data cannot be received for a long period of time, the received data may be unauthorized data transmitted from another person by spoofing, interference, or the like. Accordingly, when data is not received within the specified time, the process proceeds to step ST106, where the radio connection is disconnected. The present flowchart is then ended.

Figure 5:
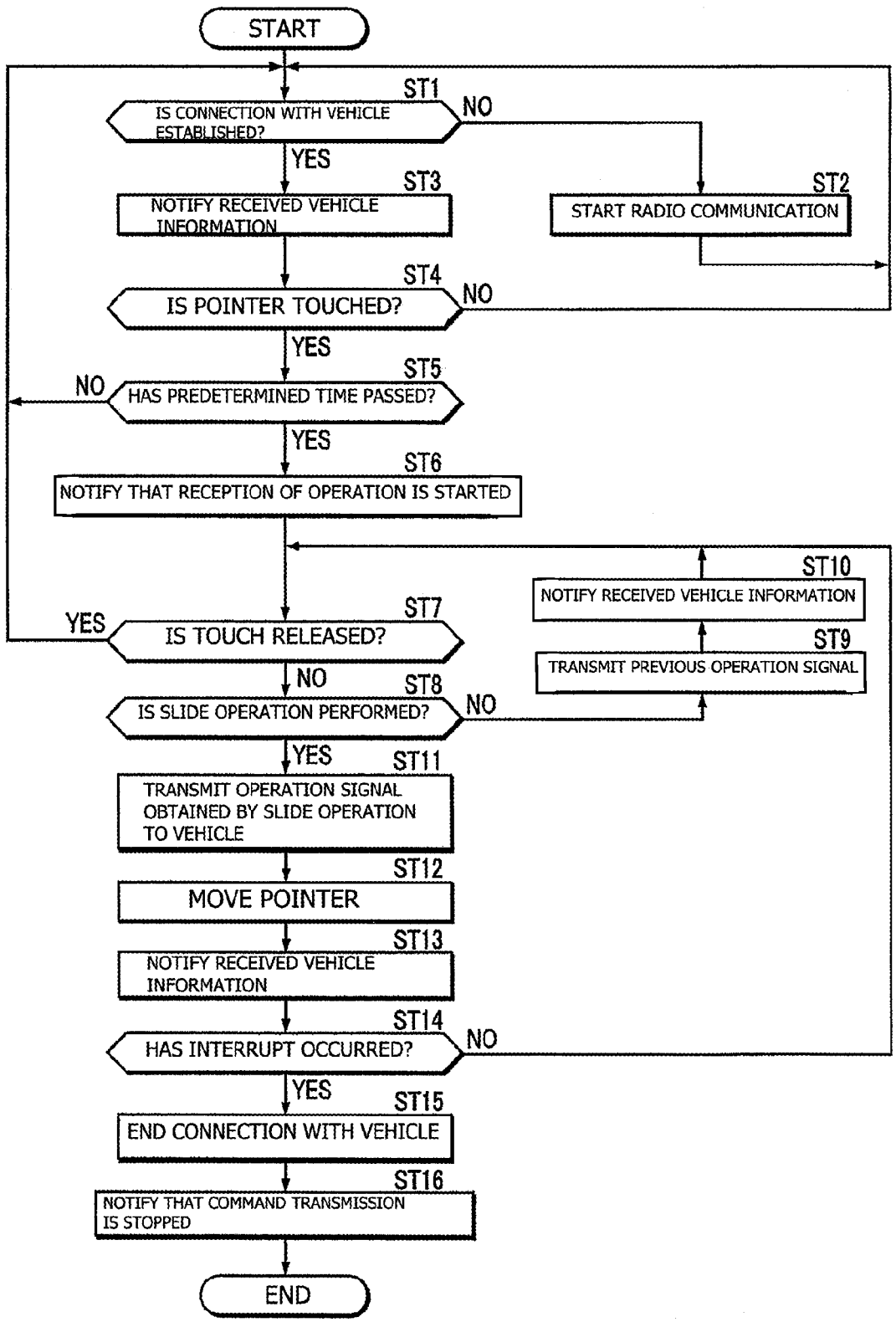
FIG. 5 is a flowchart of a process of the steering program according to the embodiment.

Incidentally, because there is a process of "ST107→ST106" as a process on the side of the vehicle 1, the steering program 29 transmits a previous operation signal when it is not determined that slide operation is performed (steps ST8 and ST9) in the flowchart of FIG. 5. Thus, even when a pointer is not slid for a long period of time in a state of being touched, the vehicle 1 receives data periodically due to the process of steps ST8 and ST9. When the portable telephone 27 is normally connected to the vehicle 1, the vehicle 1 usually receives data transmitted from the portable telephone 27 within the specified time.

When it is determined in step ST107 that data is received within the time specified in advance, the process proceeds to step ST108, where vehicle information is transmitted to the portable telephone 27. The process then proceeds to step ST109, where the control device 21 controls the electric motors 8a and 8b as the first actuator device 8 and the electric motor 17 as the second actuator device, using the information received in step ST104 as a command (Js_x, Js_y, and Js2_y) from the portable telephone 27.

The above is details of the process performed by the control device 21 of the vehicle 1 when the vehicle 1 communicates with the portable telephone 27.

In addition, for example, functions may be added to the steering program 29 of the portable telephone 27. In consideration of this, the steering program 29 in the present embodiment is configured to be able to be updated to a different program by performing radio communication with the external server SV via the second communicating section 272.

Figure 7:
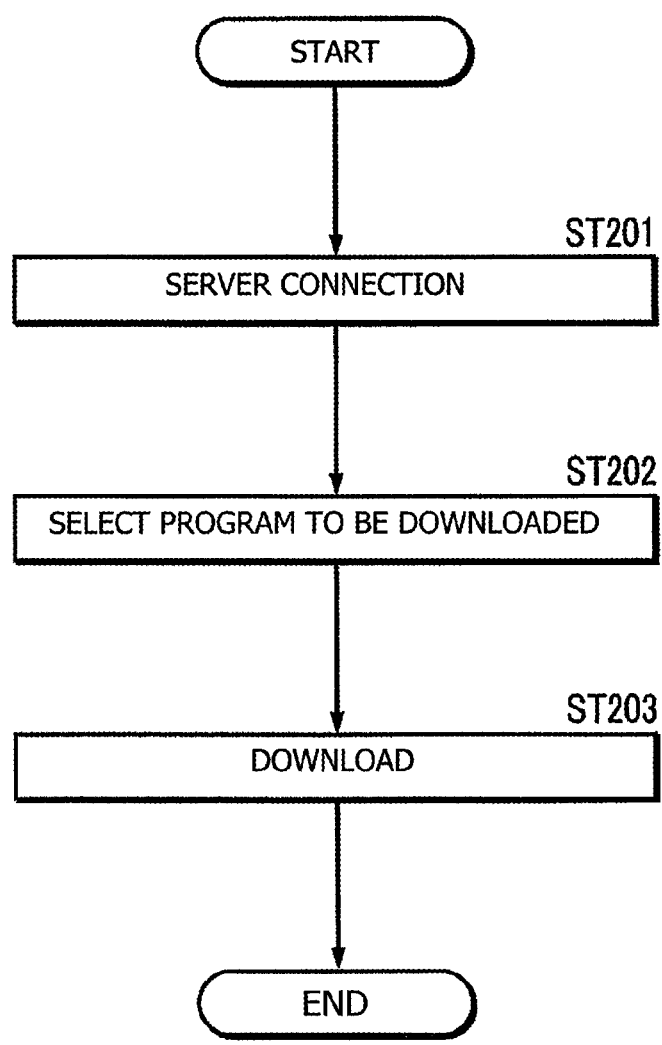
FIG. 7 is a flowchart of a process of updating the steering program according to the embodiment.

FIG. 7 shows a procedure for updating the steering program 29, which procedure is processed by the arithmetic unit 28 of the portable telephone 27. Specifically, as shown in FIG. 7, first, connection to the external server SV is established in first step ST201.

In next step ST202, a program to be downloaded is selected. The external server stores a plurality of programs so that a program can be selected according to the preferences of the occupant. This enables the occupant to select arbitrary versions of the program such for example as a "latest version" and a "previous version" when the occupant desires to use a past version of the program for some reason.

In addition, for example, programs including different methods of generating commands for slide operation may be stored so as to be selectable according to the preferences of the occupant. For example, a program for generating commands so as to make the moving velocity of the vehicle 1 slower than normal may be prepared for occupants not accustomed to the vehicle 1, and a program for generating commands so as to make the moving velocity of the vehicle 1 faster than normal may be prepared for occupants accustomed to the vehicle 1, so that these programs can be selected by an occupant according to the preferences of the occupant.

The process next proceeds to step ST203, where the program selected in step ST202 is downloaded, and stored in the storage device of the portable telephone 27. The present flowchart is then ended.

The above is details of the process of updating the steering program 29 by the arithmetic unit 28 of the portable telephone 27.

As described above, the program can be easily updated to a new version, for example. In addition, when the server stores programs that operate differently, for example, the occupant can obtain a program according to the preferences of the occupant. This improves the convenience of the operating device.

Incidentally, only one program may be stored on the server side at all times without a plurality of programs being stored on the server side. In this case, the process of step ST202 in the present flowchart is not necessary. Even in this case, an effect of easily updating the program to a new version, for example, can be obtained.

Next, description will be made of control of the first actuator device and the second actuator device by the control device 21 of the vehicle 1.

As functions realized by the implemented program and the like (functions realized by software) or functions configured by hardware, in addition to the functions of obtaining measured values as described above, the control device 21 includes: a first control processing section 24 for controlling the moving operation of the first moving operation unit 3 by controlling the electric motors 8a and 8b forming the first actuator device 8; and a second control processing section 25 for controlling the moving operation of the second moving operation unit 4 by controlling the electric motor 17 as the second actuator device.

The first control processing section 24 successively calculates a first target velocity as a target value for the moving velocity (specifically a set of a translational velocity in the X-axis direction and a translational velocity in the Y-axis direction) of the first moving operation unit 3 by performing arithmetic processing to be described later, and controls the rotational speeds of the electric motors 8a and 8b so as to make the actual moving velocity of the first moving operation unit 3 coincide with the first target velocity.

In this case, relation between the respective rotational speeds of the electric motors 8a and 8b and the actual moving velocity of the first moving operation unit 3 is determined in advance, and target values for the rotational speeds of the respective electric motors 8a and 8b are specified according to the first target velocity of the first moving operation unit 3. Then, the actual moving velocity of the first moving operation unit 3 is controlled to be the first target velocity by performing feedback control of the rotational speeds of the electric motors 8a and 8b to the target values specified according to the first target velocity.

In addition, the second control processing section 25 successively calculates a second target velocity as a target value for the moving velocity (specifically a translational velocity in the Y-axis direction) of the second moving operation unit 4 by performing arithmetic processing to be described later, and controls the rotational speed of the electric motor 17 so as to make the actual moving velocity of the second moving operation unit 4 in the Y-axis direction coincide with the second target velocity.

In this case, as in the case of the first moving operation unit 3, relation between the rotational speed of the electric motor 17 and the actual moving velocity of the second moving operation unit 4 in the Y-axis direction is determined in advance, and a target value for the rotational speed of the electric motor 17 is specified according to the second target velocity of the second moving operation unit 4. Then, the actual moving velocity of the second moving operation unit 4 in the Y-axis direction is controlled to be the second target velocity by performing feedback control of the rotational speed of the electric motor 17 to the target value specified according to the second target velocity.

To supplement the description, in the present embodiment, the second moving operation unit 4 moves in the X-axis direction in a driven manner so as to follow the movement of the first moving operation unit 3 in the X-axis direction. It is therefore not necessary to set a target value for the moving velocity of the second moving operation unit 4 in the X-axis direction.

The processing of the first control processing section 24 and the second control processing section 25 described above will next be described in more detail. The processing of the first control processing section 24 will first be described with reference to FIGS. 8 to 12.

Figure 8:
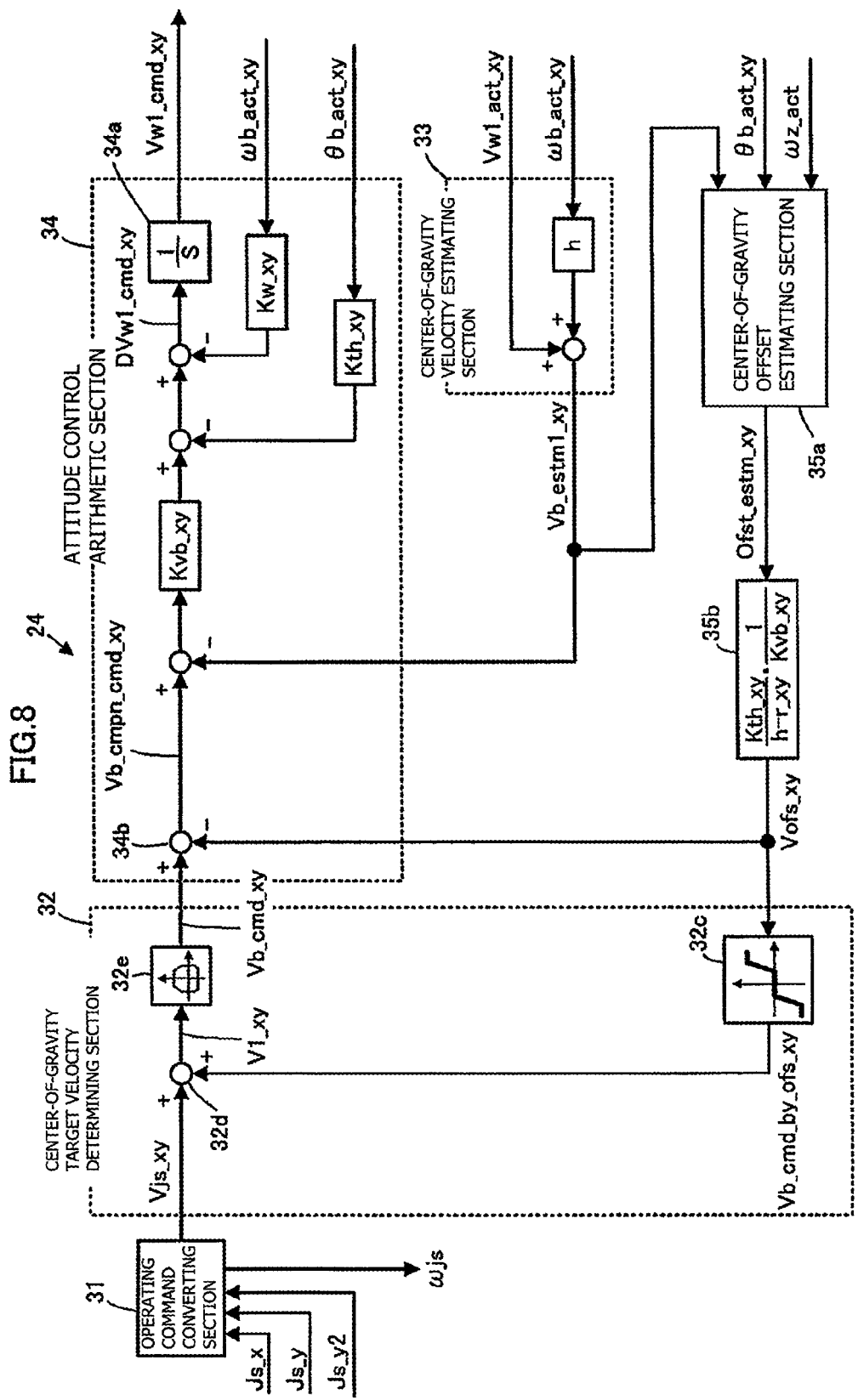
FIG. 8 is a block diagram showing the processing of a first control processing section shown in FIG. 3.

As shown in FIG. 8, as main functional parts of the first control processing section 24, the first control processing section 24 includes: an operating command converting section 31 for converting the "first vertical slide command Js_x (command corresponding to an amount of slide in the vertical direction of the first pointer 27c)," the "first horizontal slide command Js_y (command corresponding to an amount of slide in the horizontal direction of the first pointer 27c)," and the "second horizontal slide command Js2_y (command corresponding to an amount of slide in the horizontal direction of the second pointer 27e)" indicated by an operation signal input from the communicating section 26 into a velocity command for the movement of the vehicle 1; a center-of-gravity target velocity determining section 32 for determining a target velocity for the center of gravity of the whole including the vehicle 1 and the occupant boarded on the occupant boarding member 5 (which center of gravity will hereinafter be referred to as the center of gravity of the whole of a vehicle system); a center-of-gravity velocity estimating section 33 for estimating the velocity of the center of gravity of the whole of the vehicle system; and an attitude control arithmetic section 34 for determining the target value for the moving velocity of the first moving operation unit 3 so as to stabilize the attitude of the occupant boarding member 5 (attitude of the base 2) while making the estimated velocity of the center of gravity of the whole of the vehicle system follow the target velocity.

The first control processing section 24 performs the processing of these functional parts in predetermined arithmetic processing cycles of the control device 21.

According to the present embodiment, the center of gravity of the whole of the vehicle system has a meaning as an example of a representative point of the vehicle 1. The velocity of the center of gravity of the whole of the vehicle system therefore means the velocity of translational movement of the representative point.

Figure 9:
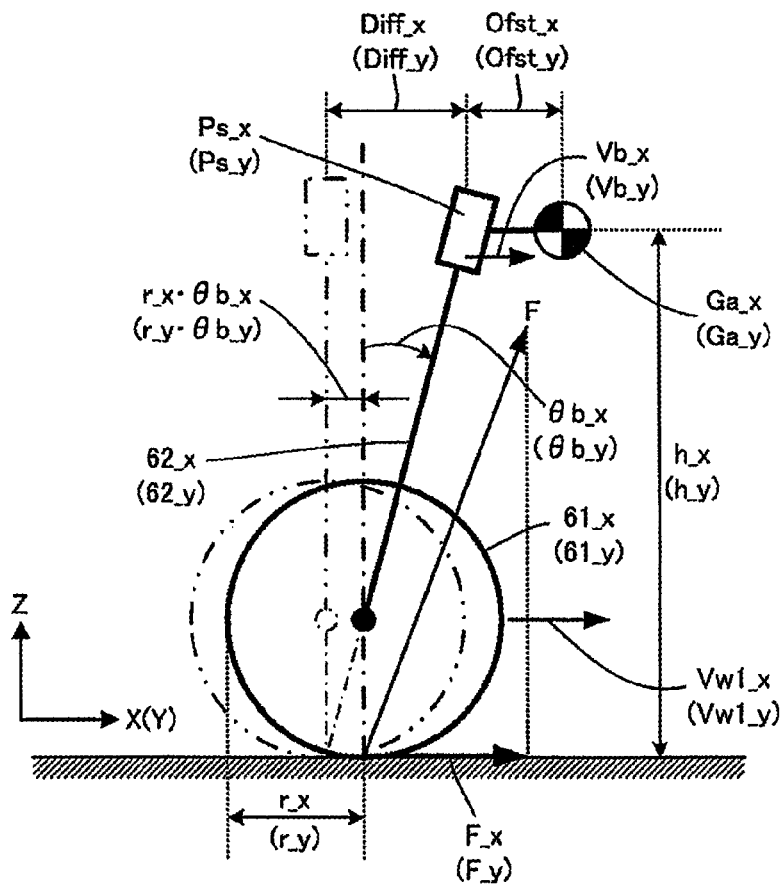
FIG. 9 is a diagram of assistance in explaining an inverted pendulum model used for the processing of the first control processing section shown in FIG. 3.

Before concrete description of the processing of the functional parts of the first control processing section 24, items serving as a basis for the processing will be described in the following. The dynamic behavior of the center of gravity of the whole of the vehicle system (specifically behavior as viewed from the Y-axis direction and behavior as viewed from the X-axis direction) is approximately represented by the behavior of an inverted pendulum model as shown in FIG. 9. An algorithm for the processing of the first control processing section 24 is constructed on the basis of this behavior.

Incidentally, including the reference symbols in FIG. 9, in the following description, a suffix "_x" denotes a reference symbol such as a variable or the like in a case of viewing from the Y-axis direction, and a suffix "_y" denotes a reference symbol such as a variable or the like in a case of viewing from the X-axis direction. In addition, in FIG. 9, in order to show both of an inverted pendulum model as viewed from the Y-axis direction and an inverted pendulum model as viewed from the X-axis direction, the reference symbols of variables in the case of viewing from the Y-axis direction are not parenthesized, but the reference symbols of variables in the case of viewing from the X-axis direction are parenthesized.

The inverted pendulum model representing the behavior of the center of gravity of the whole of the vehicle system as viewed from the Y-axis direction includes: an imaginary wheel 61_x that has an axis of rotation parallel with the Y-axis direction and which is rotatable on the floor surface (which imaginary wheel will hereinafter be referred to as an imaginary wheel 61_x); a rod 62_x that is extended from the center of rotation of the imaginary wheel 61_x and which is swingable about the axis of rotation of the imaginary wheel 61_x (in the direction about the Y-axis); and a mass point Ga_x coupled to a reference part Ps_x as an end part (upper end part) of the rod 62_x.

In the inverted pendulum model, the movement of the mass point Ga_x corresponds to the movement of the center of gravity of the whole of the vehicle system as viewed from the Y-axis direction, and the angle of inclination θb_x of the rod 62_x with respect to the vertical direction (angle of inclination in the direction about the Y-axis) coincides with the angle of inclination of the occupant boarding member 5 (or the base 2) in the direction about the Y-axis. In addition, the translational movement of the first moving operation unit 3 in the X-axis direction corresponds to translational movement in the X-axis direction due to the rotation of the imaginary wheel 61_x.

The radius r_x of the imaginary wheel 61_x and the height h_x of the reference part Ps_x and the mass point Ga_x from the floor surface are a predetermined value (fixed value) set in advance.

Similarly, the inverted pendulum model representing the behavior of the center of gravity of the whole of the vehicle system as viewed from the X-axis direction includes: an imaginary wheel 61_y that has an axis of rotation parallel with the X-axis direction and which is rotatable on the floor surface (which imaginary wheel will hereinafter be referred to as an imaginary wheel 61_y); a rod 62_y that is extended from the center of rotation of the imaginary wheel 61_y and which is swingable about the axis of rotation of the imaginary wheel 61_y (in the direction about the X-axis); and a mass point Ga_y coupled to a reference part Ps_y as an end part (upper end part) of the rod 62_y.

In the inverted pendulum model, the movement of the mass point Ga_y corresponds to the movement of the center of gravity of the whole of the vehicle system as viewed from the X-axis direction, and the angle of inclination θb_y of the rod 62_y with respect to the vertical direction (angle of inclination in the direction about the X-axis) coincides with the angle of inclination of the occupant boarding member 5 (or the base 2) in the direction about the X-axis. In addition, the translational movement of the first moving operation unit 3 in the Y-axis direction corresponds to translational movement in the Y-axis direction due to the rotation of the imaginary wheel 61_y.

The radius r_y of the imaginary wheel 61_y and the height h_y of the reference part Ps_y and the mass point Ga_y from the floor surface are a predetermined value (fixed value) set in advance. Incidentally, the height h_y of the reference part Ps_y and the mass point Ga_y from the floor surface as viewed from the X-axis direction is the same as the height h_x of the reference part Ps_x and the mass point Ga_x from the floor surface as viewed from the Y-axis direction. Accordingly, hereinafter, let h_x=h_y=h.

In order to supplement the description in regard to positional relation between the reference part Ps_x and the mass point Ga_x as viewed from the Y-axis direction, the position of the reference part Ps_x corresponds to the position of the center of gravity of the whole of the vehicle system in a case where the occupant boarded (seated) on the occupant boarding member 5 remains in a predetermined neutral position with respect to the occupant boarding member 5 and is motionless. Thus, in this case, the position of the mass point Ga_x coincides with the position of the reference part Ps_x.

The same is true for positional relation between the reference part Ps_y and the mass point Ga_y as viewed from the X-axis direction.

However, in actuality, when the occupant boarded on the occupant boarding member 5 moves the upper part of the body or the like of the occupant with respect to the occupant boarding member 5 (or the base 2), the position in the X-axis direction and the position in the Y-axis direction of the actual center of gravity of the whole of the vehicle system are generally offset from the positions of the reference parts Ps_x and Ps_y, respectively, in the horizontal direction. Thus, in FIG. 9, the positions of the mass points Ga_x and Ga_y are shown offset from the positions of the reference parts Ps_x and Ps_y, respectively.

The behavior of the center of gravity of the whole of the vehicle system which behavior is represented by the inverted pendulum model is expressed by the following Equations (1a), (1b), (2a), and (2b). In this case, Equations (1a) and (1b) express the behavior as viewed in the Y-axis direction, and Equations (2a) and (2b) express the behavior as viewed in the X-axis direction.

$$Vb\_x = Vw1\_x + h \cdot \omega b\_x \quad (1a)$$

$$dVb\_x/dt = (g/h) \cdot (\theta b\_x \cdot (h-r\_x) + Ofst\_x) + \omega z \cdot Vb\_y \quad (1b)$$

$$Vb\_y = Vw1\_y + h \cdot \omega b\_y \quad (2a)$$

$$dVb\_y/dt = (g/h) \cdot (\theta b\_y \cdot (h-r\_y) + Ofst\_y) - \omega z \cdot Vb\_x \quad (2b)$$

where Vb_x is the velocity (translational velocity) of the center of gravity of the whole of the vehicle system in the X-axis direction; Vw1_x is the moving velocity (translational velocity) of the imaginary wheel 61_x in the X-axis direction; θb_x is the angle of inclination of the occupant boarding member 5 (or the base 2) in the direction about the Y-axis; ωb_x is a temporal change rate of the angle of inclination θb_x (=dθb_x/dt); Ofst_x is an amount of offset in the X-axis direction of the position of the center of gravity of the whole of the vehicle system in the X-axis direction (position of the mass point Ga_x in the X-axis direction) from the position of the reference part Ps_x; Vb_y is the velocity (translational velocity) of the center of gravity of the whole of the vehicle system in the Y-axis direction; Vw1_y is the moving velocity (translational velocity) of the imaginary wheel 61_y in the Y-axis direction; θb_y is the angle of inclination of the occupant boarding member 5 (or the base 2) in the direction about the X-axis; ωb_y is a temporal change rate of the angle of inclination θb_y (=dθb_y/dt); Ofst_y is an amount of offset in the Y-axis direction of the position of the center of gravity of the whole of the vehicle system in the Y-axis direction (position of the mass point Ga_y in the Y-axis direction) from the position of the reference part Ps_y. In addition, ωz is a yaw rate (angular velocity in a direction about the yaw axis) at a time of turning of the vehicle 1, and g is a gravitational acceleration constant. Incidentally, the positive direction of the angle of inclination θb_x and the temporal change rate ωb_x is a direction in which the center of gravity of the whole of the vehicle system inclines in the positive direction of the X-axis (forward direction), and the positive direction of the angle of inclination θb_y and the temporal change rate ωb_y is a direction in which the center of gravity of the whole of the vehicle system inclines in the positive direction of the Y-axis (left direction). In addition, the positive direction of the yaw rate ωz is a counterclockwise direction when the vehicle 1 is viewed from above.

A second term (=h·ωb_x) on the right side of Equation (1a) is a translational velocity component of the reference part Ps_x in the X-axis direction which component is produced by tilting of the occupant boarding member 5 in the direction about the Y-axis. A second term (=h·ωb_y) on the right side of Equation (2a) is a translational velocity component of the reference part Ps_y in the Y-axis direction which component is produced by tilting of the occupant boarding member 5 in the direction about the X-axis.

A first term on the right side of Equation (1b) is an acceleration component in the X-axis direction which component is produced at the center of gravity of the whole of the vehicle system by an X-axis direction component (F_x in FIG. 9) of a floor reaction force (F in FIG. 9) acting on the grounded part of the imaginary wheel 61_x according to an amount of offset (=θb_x·(h−r_x)+Ofst_x) of the position of the center of gravity of the whole of the vehicle system in the X-axis direction (position of the mass point Ga_x in the X-axis direction) from a position vertically above the grounded part of the imaginary wheel 61_x (grounded part of the first moving operation unit 3 as viewed from the Y-axis direction). A second term on the right side of Equation (1b) is an acceleration component in the X-axis direction which component is produced by a centrifugal force acting on the vehicle 1 at a time of turning at the yaw rate of ωz.

Similarly, a first term on the right side of Equation (2b) is an acceleration component in the Y-axis direction which component is produced at the center of gravity of the whole of the vehicle system by a Y-axis direction component (F_y in FIG. 9) of the floor reaction force (F in FIG. 9) acting on the grounded part of the imaginary wheel 61_y according to an amount of offset (=θb_y·(h−r_y)+Ofst_y) of the position of the center of gravity of the whole of the vehicle system in the Y-axis direction (position of the mass point Ga_y in the Y-axis direction) from a position vertically above the grounded part of the imaginary wheel 61_y (grounded part of the first moving operation unit 3 as viewed from the X-axis direction). A second term on the right side of Equation (2b) is an acceleration component in the Y-axis direction which component is produced by the centrifugal force acting on the vehicle 1 at a time of turning at the yaw rate of ωz.

The behavior expressed by Equations (1a) and (1b) (behavior as viewed in the X-axis direction) as described above is represented as shown in FIG. 10 when expressed in a block diagram. 1/s in FIG. 10 denotes an integrating operation.

Figure 10:
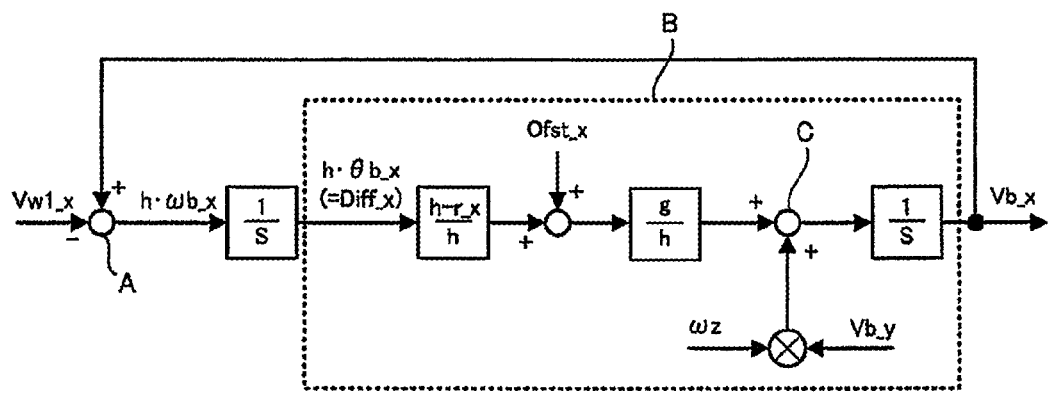
FIG. 10 is a block diagram showing behavior relating to the inverted pendulum model of FIG. 9.

The processing of an arithmetic section with a reference character A in FIG. 10 corresponds to the relational expression of Equation (1a). The processing of an arithmetic section with a reference character B in FIG. 10 corresponds to the relational expression of Equation (1b).

It may be noted that, h·θb_x in FIG. 10 approximately equates to Diff_x shown in FIG. 9.

Meanwhile, a block diagram expressing the behavior represented by Equations (2a) and (2b) (behavior as viewed in the Y-axis direction) is obtained by replacing the suffix "_x" in FIG. 10 with "y" and replacing the sign "+" of the acceleration component on the lower side of FIG. 10 (acceleration component produced by the centrifugal force) as one of inputs to an adder with a reference character C with "−."

In the present embodiment, the algorithm for the processing of the first control processing section 24 is constructed on the basis of the behavior model of the center of gravity of the whole of the vehicle system (inverted pendulum model) in which the amounts of offset of the center of gravity of the whole of the vehicle system from the reference parts Ps_x and Ps_y and the centrifugal force are taken into account as described above.

Based on the above as a premise, more concrete description will be made of the processing of the first control processing section 24. Incidentally, in the following description, a set of the value of a variable relating to the behavior as viewed from the Y-axis direction and the value of a variable relating to the behavior as viewed from the X-axis direction may be expressed with a suffix "_xy" added thereto.

Referring to FIG. 8, the first control processing section 24 first performs the processing of the operating command converting section 31 and the processing of the center-of-gravity velocity estimating section 33 in each arithmetic processing cycle of the control device 21.

Figure 11:
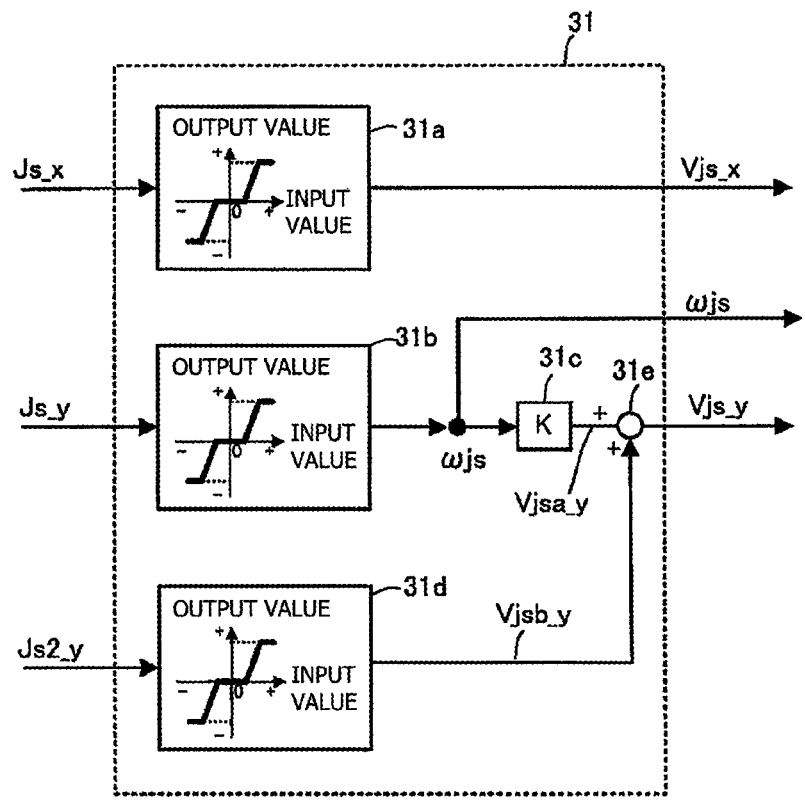
FIG. 11 is a block diagram showing the processing of an operating command converting section shown in FIG. 8.

As shown in FIG. 11, the operating command converting section 31 determines a basic velocity command Vjs_xy as a basic command value for the moving velocity (translational velocity) of the first moving operation unit 3 and a basic turning angular velocity command ωjs as a basic command value for the angular velocity in the direction about the yaw axis at a time of turning of the vehicle 1 according to the first horizontal slide command Js_y, the first vertical slide command Js_x, and the second horizontal slide command Js2_y.

A processing section 31a determines a basic velocity command Vjs_x in the X-axis direction of the basic velocity command Vjs_xy according to the first vertical slide command Js_x. Specifically, when the first vertical slide command Js_x is a command corresponding to an amount of slide in the positive direction of the first pointer 27c (amount of slide in an upward direction), the basic velocity command Vjs_x in the X-axis direction is a velocity command for the forward movement direction of the vehicle 1 (positive velocity command).

When the first vertical slide command Js_x is a command corresponding to an amount of slide in the negative direction of the first pointer 27c (amount of slide in a downward direction), the basic velocity command Vjs_x in the X-axis direction is a velocity command for the rearward movement direction of the vehicle 1 (negative velocity command). In addition, in this case, the magnitude of the basic velocity command Vjs_x in the X-axis direction is determined so as to be increased in a range not exceeding a predetermined upper limit value as the magnitude of the first vertical slide command Js_x is increased.

Incidentally, a predetermined range in which the magnitude of the first vertical slide command Js_x is sufficiently minute may be set as a dead zone, and the basic velocity command Vjs_x in the X-axis direction may be set to zero for amounts of slide within the dead zone. A graph shown in the processing section 31a in FIG. 11 shows relation between the input (Js_x) and the output (Vjs_x) when the above-described dead zone is provided.

In addition, the basic velocity command Vjs_y in the Y-axis direction of the basic velocity command Vjs_xy is determined as a velocity command in the Y-axis direction of the first moving operation unit 3 for turning the vehicle 1 according to the first horizontal slide command Js_y and the second horizontal slide command Js2_y.

As described above, in the present embodiment, when a point in the first operating region 27b and a point in the second operating region 27d are touched simultaneously, the steering program 29 determines that the touching of only an operating region touched first is valid, and determines that the touching of an operating region touched later is invalid.

Therefore, the first horizontal slide command Js_y (and the first vertical slide command Js_x) and the second horizontal slide command Js2_y are not simultaneously output from the portable telephone 27. At a predetermined point in time, only a command (Js_y or Js2_y) corresponding to an amount of slide of one of the pointers (27c or 27e) is always input to the operating command converting section 31.

"When the first horizontal slide command Js_y and the second horizontal slide command Js2_y are a command corresponding to an amount of slide in the negative direction (amount of slide in the right direction)," the basic velocity command Vjs_y in the Y-axis direction is a velocity command for the right direction of the vehicle 1 (negative velocity command). "When the first horizontal slide command Js_y and the second horizontal slide command Js2_y are a command corresponding to an amount of slide in the positive direction (amount of slide in the left direction)," the basic velocity command Vjs_y in the Y-axis direction is a velocity command for the left direction of the vehicle 1 (positive velocity command).

In this case, the magnitude of the basic velocity command Vjs_y in the Y-axis direction is determined so as to be increased in a range not exceeding a predetermined upper limit value as the magnitude of the first horizontal slide command Js_y and the second horizontal slide command Js2_y is increased.

More specifically, for example, as shown in FIG. 11, the processing of a processing section 31b determines the basic turning angular velocity command ωjs as a basic command value for the angular velocity in the direction about the yaw axis at a time of turning of the vehicle 1 according to the first horizontal slide command Js_y. In this case, when the first horizontal slide command Js_y is a command corresponding to an amount of slide in the positive direction (amount of slide in the left direction), the basic turning angular velocity command ωjs is an angular velocity command for turning in the counterclockwise direction (positive angular velocity command). When the first horizontal slide command Js_y is a command corresponding to an amount of slide in the negative direction (amount of slide in the right direction), the basic turning angular velocity command ωjs is an angular velocity command for turning in the clockwise direction (negative angular velocity command).

In this case, the magnitude of the basic turning angular velocity command ωjs is determined so as to be increased in a range not exceeding a predetermined upper limit value as the magnitude of the first horizontal slide command Js_y is increased.

A processing section 31c then determines a basic velocity first command Vjsa_y in the Y-axis direction of the first moving operation unit 3 by multiplying the basic turning angular velocity command ωjs by a negative value K, which is obtained by multiplying, by (−1), a predetermined value (>0) determined in advance as a distance in the X-axis direction between the instantaneous turning center of the vehicle 1 and the grounded part of the first moving operation unit 3. The instantaneous turning center means the center of rotation in the direction about the yaw axis of the vehicle 1 (center of rotation as viewed in a coordinate system moving integrally with the vehicle 1) at each time during the turning of the vehicle 1 (time in each arithmetic processing cycle of the control device 21).

A predetermined range in which the magnitude of the first horizontal slide command Js_y is sufficiently minute may be set as a dead zone, and the basic turning angular velocity command ωjs may be set to zero for amounts of slide within the dead zone. A graph shown in the processing section 31b in FIG. 11 shows relation between the input (Js_y) and the output (ωjs) when the above-described dead zone is provided.

In addition, as shown in FIG. 11, the processing of a processing section 31d determines a basic velocity second command Vjsb_y as a basic velocity command value in the left-right direction of the vehicle 1 according to the second horizontal slide command Js2_y. In this case, when the second horizontal slide command Js2_y represents an amount of slide in the positive direction (amount of slide in the left direction), the basic velocity second command Vjsb_y is a velocity command for the left direction of the vehicle 1 (positive velocity command).

When the second horizontal slide command Js2_y represents an amount of slide in the negative direction (amount of slide in the right direction), the basic velocity second command Vjsb_y is a velocity command for the right direction of the vehicle 1 (negative velocity command). In this case, the magnitude of the basic velocity second command Vjsb_y is determined so as to be increased in a range not exceeding a predetermined upper limit value as the magnitude of the second horizontal slide command Js2_y is increased.

A predetermined range in which the magnitude of the second horizontal slide command Js2_y is sufficiently minute may be set as a dead zone, and the basic velocity second command Vjsb_y may be set to zero for amounts of slide within the dead zone. A graph shown in the processing section 31d in FIG. 11 shows relation between the input (Js2_y) and the output (Vjsb_y) when the above-described dead zone is provided.

A processing section 31e then determines the basic velocity command Vjs_y in the Y-axis direction of the first moving operation unit 3 by adding the basic velocity second command Vjsb_y to the basic velocity first command Vjsa_y. Incidentally, as described above, the first horizontal slide command Js_y and the second horizontal slide command Js2_y are not output simultaneously at a predetermined point in time. In other words, one of the basic velocity first command Vjsa_y and the basic velocity second command Vjsb_y is zero. The basic velocity command Vjs_y therefore has the same value as one of the basic velocity first command Vjsa_y and the basic velocity second command Vjsb_y that is not zero at a predetermined point in time.

In addition, when the first pointer 27c is operated in both of the vertical direction and the horizontal direction, the magnitude of the basic velocity command Vjs_y in the Y-axis direction may be changed according to the first vertical slide command Js_x or the basic velocity command Vjs_x in the X-axis direction.

Incidentally, in the present embodiment, a state in which the basic turning angular velocity command ωjs determined according to slide operation of the first pointer 27c in the horizontal direction is not zero corresponds to a state in which a turning command for turning the vehicle 1 is output from the portable telephone 27 as operating device. A state in which the basic turning angular velocity command ωjs is zero corresponds to a state in which the turning command is not output from the portable telephone 27 as operating device. In addition, a state in which the basic velocity second command Vjsb_y determined according to slide operation of the second pointer 27e in the horizontal direction is not zero corresponds to a state in which a command for moving the vehicle 1 in the left-right direction is output from the portable telephone 27 as operating device. That is, the operation of the first pointer 27c corresponds to a first operation in the present invention, and the operation of the second pointer 27e corresponds to a second operation in the present invention.

The center-of-gravity velocity estimating section 33 calculates the estimated value Vb_estm1_xy of the velocity of the center of gravity of the whole of the vehicle system on the basis of geometric (kinematic) relational expressions shown in the above-described Equations (1a) and (2a) in the inverted pendulum model.

Specifically, as shown in the block diagram of FIG. 8, the estimated value Vb_estm1_xy of the velocity of the center of gravity of the whole of the vehicle system is calculated by adding together the value of actual translational velocity Vw1_act_xy of the first moving operation unit 3 and a value obtained by multiplying the actual temporal change rate (inclination angular velocity) ωb_act_xy of the angle of inclination θb_xy of the occupant boarding member 5 by the height h of the center of gravity of the whole of the vehicle system.

That is, the estimated value Vb_estm1_x of the velocity in the X-axis direction of the center of gravity of the whole of the vehicle system and the estimated value Vb_estm1_y of the velocity in the Y-axis direction of the center of gravity of the whole of the vehicle system are calculated by the following Equations (3a) and (3b), respectively.

$$Vb\_estm1\_x = Vw1\_act\_x + h \cdot \omega b\_act\_x \quad (3a)$$

$$Vb\_estm1\_y = Vw1\_act\_y + h \cdot \omega b\_act\_y \quad (3b)$$

However, the temporal change rate of the amount of offset Ofst_xy of the position of the center of gravity of the whole of the vehicle system from the position of the reference part Ps_xy (which amount of offset will hereinafter be referred to as an amount of offset Ofst_xy of the center of gravity) is assumed to be sufficiently low and negligible as compared with the estimated value Vb_estm1_xy.

In this case, used as the values of Vw1_act_x and Vw1_act_y in the above operation in the present embodiment are target values Vw1_cmd_x and Vw1_cmd_y (previous values) of the moving velocity of the first moving operation unit 3 which target values are determined by the attitude control arithmetic section 34 in a previous arithmetic processing cycle.

However, for example, the respective rotational speeds of the electric motors 8a and 8b may be detected by a rotational speed sensor such as a rotary encoder or the like, and the latest values of Vw1_act_x and Vw1_act_y estimated from the detected values of these rotational speeds (in other words, the latest values of measured values of Vw1_act_x and Vw1_act_y) may be used for the operations of Equations (3a) and (3b).

In addition, used as the values of ωb_act_x and ωb_act_y in the present embodiment is the latest value of the temporal change rate of the measured value of the angle of inclination θb of the occupant boarding member 5 on the basis of the detection signal of the inclination sensor 22 (in other words, the latest values of measured values of ωb_act_x and ωb_act_y).

After performing the processing of the operating command converting section 31 and the center-of-gravity velocity estimating section 33 as described above, the first control processing section 24 next determines a center-of-gravity offset amount estimated value Ofst_estm_xy as the estimated value of the amount of offset Ofst_xy of the center of gravity by performing the processing of a center-of-gravity offset estimating section 35a shown in FIG. 8.

Figure 12:
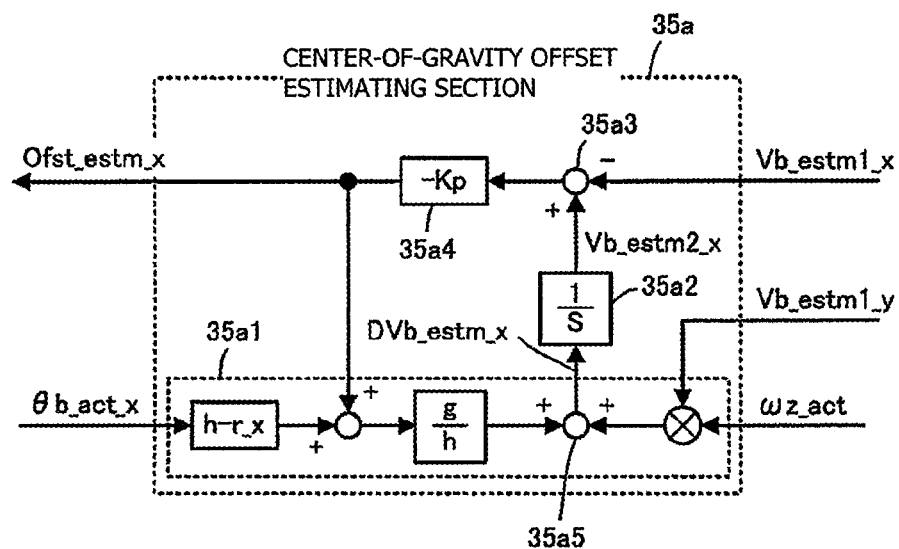
FIG. 12 is a block diagram showing the processing of a center-of-gravity offset estimating section shown in FIG. 8.

The processing of the center-of-gravity offset estimating section 35a is processing shown by a block diagram of FIG. 12. Incidentally, FIG. 12 representatively shows a process of determining the center-of-gravity offset amount estimated value Ofst_estm_x in the X-axis direction of the center-of-gravity offset amount estimated value Ofst_estm_xy.

Describing the processing of FIG. 12 concretely, the center-of-gravity offset estimating section 35a calculates the estimated value DVb_estm_x of translational acceleration in the X-axis direction of the center of gravity of the whole of the vehicle system by performing the arithmetic processing on the right side of the above-described Equation (1b) in an arithmetic section 35a1 using the measured value (latest value) of the actual angle of inclination $\theta b\_act\_x$ in the direction about the Y-axis of the occupant boarding member 5 which measured value is obtained from the detection signal of the inclination sensor 22, the measured value (latest value) of the actual yaw rate $\omega wz\_act$ of the vehicle 1 which measured value is obtained from the detection signal of the yaw rate sensor 23, the first estimated value Vb_estm1_y (latest value) of the velocity in the Y-axis direction of the center of gravity of the whole of the vehicle system which estimated value is calculated by the center-of-gravity velocity estimating section 33, and the center-of-gravity offset amount estimated value Ofst_estm_x (previous value) in the X-axis direction which estimated value is determined in a previous arithmetic processing cycle.

The center-of-gravity offset estimating section 35a further calculates the second estimated value Vb_estm2_x of the velocity in the X-axis direction of the center of gravity of the whole of the vehicle system by performing a process of integrating the estimated value DVb_estm_x of translational acceleration in the X-axis direction of the center of gravity of the whole of the vehicle system in an arithmetic section 35a2.

The center-of-gravity offset estimating section 35a next performs a process of calculating a deviation between the second estimated value Vb_estm2_x (latest value) of the velocity in the X-axis direction of the center of gravity of the whole of the vehicle system and the first estimated value Vb_estm1_x (latest value) of the velocity in the X-axis direction of the center of gravity of the whole of the vehicle system in an arithmetic section 35a3.

The center-of-gravity offset estimating section 35a further determines the latest value of the center-of-gravity offset amount estimated value Ofst_estm_x in the X-axis direction by performing a process of multiplying the deviation by a gain (−Kp) of a predetermined value in an arithmetic section 35a4.

A process of determining the center-of-gravity offset amount estimated value Ofst_estm_y in the Y-axis direction is performed in a similar manner to the above. Specifically, a block diagram showing the determining process is obtained by replacing the suffix "_x" in FIG. 12 with "_y" and replacing the sign "+" of a acceleration component on the right side of FIG. 12 (acceleration component produced by the centrifugal force) as one of inputs to an adder 35a5 with "−."

The center-of-gravity offset amount estimated value Ofst_estm_xy is determined while successively updated by such processing of the center-of-gravity offset estimating section 35a. Thereby the center-of-gravity offset amount estimated value Ofst_estm_xy can be determined so as to converge to the actual value.

The first control processing section 24 next calculates a center-of-gravity offset effect amount Vofs_xy by performing the processing of a center-of-gravity offset effect amount calculating section 35b shown in FIG. 8.

The center-of-gravity offset effect amount Vofs_xy represents the offset of an actual center-of-gravity velocity with respect to the target velocity of the center of gravity of the whole of the vehicle system when feedback control is performed without consideration being given to the offset of the position of the center of gravity of the whole of the vehicle system from the position of the reference part Ps_xy in the inverted pendulum model in the attitude control arithmetic section 34 to be described later.

Specifically, the center-of-gravity offset effect amount calculating section 35b calculates the center-of-gravity offset effect amount Vofs_xy by multiplying a value of (Kth_xy/(h−r_xy))/Kvb_xy by each component of the newly determined center-of-gravity offset amount estimated value Ofst_estm_xy.

It may be noted that, Kth_xy is a gain value for determining an operation amount component functioning so as to bring the angle of inclination of the occupant boarding member 5 close to zero (target angle of inclination) in the processing of the attitude control arithmetic section 34 to be described later. Kvb_xy is a gain value for determining an operation amount component functioning so as to bring a deviation between the target velocity Vb_cmd_xy of the center of gravity of the whole of the vehicle system and the first estimated value Vb_estm1_xy of the velocity of the center of gravity of the whole of the vehicle system close to zero in the processing of the attitude control arithmetic section 34 to be described later.

The first control processing section 24 next calculates an after-limitation center-of-gravity target velocity Vb_cmd_xy on the basis of the basic velocity command Vjs_xy determined by the operating command converting section 31 and the center-of-gravity offset effect amount Vofs_xy determined by the center-of-gravity offset effect amount calculating section 35b by performing the processing of the center-of-gravity target velocity determining section 32 shown in FIG. 8.

The center-of-gravity target velocity determining section 32 first performs the processing of a processing section 32c shown in FIG. 8. This processing section 32c determines a target center-of-gravity velocity addition amount Vb_cmd_by_ofs_xy as a component corresponding to a center-of-gravity offset among the target values of the center of gravity of the whole of the vehicle system by performing dead zone processing and limit processing for the value of the center-of-gravity offset effect amount Vofs_xy.

Specifically, in the present embodiment, the center-of-gravity target velocity determining section 32 sets the target center-of-gravity velocity addition amount Vb_cmd_by_ofs_x in the X-axis direction to zero when the magnitude of the center-of-gravity offset effect amount Vofs_x in the X-axis direction is a value within a dead zone as a predetermined range in a region of zero (a value relatively close to zero).

In addition, when the magnitude of the center-of-gravity offset effect amount Vofs_x in the X-axis direction is a value deviating from within the dead zone, the center-of-gravity target velocity determining section 32 determines the target center-of-gravity velocity addition amount Vb_cmd_by_ofs_x in the X-axis direction so as to have the same polarity as the center-of-gravity offset effect amount Vofs_x and increase in magnitude as the magnitude of the center-of-gravity offset effect amount Vofs_x is increased. However, the value of the target center-of-gravity velocity addition amount Vb_cmd_by_ofs_x is limited to within a range between a predetermined upper limit value (>0) and a predetermined lower limit value (≤0).

A process of determining the target center-of-gravity velocity addition amount Vb_cmd_by_ofs_y in the Y-axis direction is similar to the above.

The center-of-gravity target velocity determining section 32 next performs a process of determining a target velocity V1_xy, which is obtained by adding the components of the target center-of-gravity velocity addition amount Vb_cmd_by_ofs_xy to the respective components of the basic velocity command Vjs_xy determined by the operating command converting section 31 in a processing section 32d shown in FIG. 8. That is, the target velocity V1_xy (set of V1_x and V1_y) is determined by the processing of V1_x=Vjs_x+Vb_cmd_by_ofs_x and V1_y=Vjs_y+Vb_cmd_by_ofs_y.

The center-of-gravity target velocity determining section 32 further performs the processing of a processing section 32e. The processing section 32e performs limit processing that determines the after-limitation center-of-gravity target velocity Vb_cmd_xy (set of Vb_cmd_x and Vb_cmd_y) as the target velocity of the center of gravity of the whole of the vehicle system, the after-limitation center-of-gravity target velocity Vb_cmd_xy being obtained by limiting the combination of the target velocities V 1_x and V 1_y, in order to prevent the respective rotational speeds of the electric motors 8a and 8b as the first actuator device 8 of the first moving operation unit 3 from deviating from a predetermined allowable range.

In this case, when the set of the target velocities V1_x and V1_y obtained by the processing section 32d is present within a predetermined region (for example a region in the shape of an octagon) on a coordinate system in which an axis of ordinates indicates the value of the target velocity V1_x and an axis of abscissas indicates the value of the target velocity V1_y, the target velocity V1_xy is determined as the after-limitation center-of-gravity target velocity Vb_cmd_xy as it is.

When the set of the target velocities V1_x and V1_y obtained by the processing section 32d deviates from the predetermined region on the coordinate system, the target velocity V1_xy limited to a set on a boundary of the predetermined region is determined as the after-limitation center-of-gravity target velocity Vb_cmd_xy.

As described above, the center-of-gravity target velocity Vb_cmd_xy is determined on the basis of the basic velocity command Vjs_xy and the center-of-gravity offset effect amount Vofs_xy (or the center-of-gravity offset). The occupant can therefore steer the vehicle 1 by operation of the operating device (operation of the portable telephone 27) and changes in the attitude of the body of the occupant (movement of body weight).

After performing the processing of the center-of-gravity target velocity determining section 32 as described above, the first control processing section 24 next performs the processing of the attitude control arithmetic section 34. The attitude control arithmetic section 34 determines a first target velocity Vw1_cmd_xy as a target value for the moving velocity (translational velocity) of the first moving operation unit 3 by processing shown in the block diagram of FIG. 8.

More specifically, the attitude control arithmetic section 34 first determines a target velocity Vb_cmpn_cmd_xy (latest value) after center-of-gravity offset compensation by performing a process of subtracting the components of the center-of-gravity offset effect amount Vofs_xy from the respective components of the after-limitation center-of-gravity target velocity Vb_cmd_xy in an arithmetic section 34b.

The attitude control arithmetic section 34 next calculates a target translational acceleration DVw1_cmd_x in the X-axis direction and a target translational acceleration DVw1_cmd_y in the Y-axis direction of a target translational acceleration DVw1_cmd_xy as a target value for the translational acceleration of the grounded part of the first moving operation unit 3 by the processing of the above-described arithmetic section 34b and an arithmetic section excluding an integrating arithmetic section 34a for performing integrating operation, by the operations of the following Equations (4a) and (4b).

$$DVw1\_cmd\_x = Kvb\_x \cdot (Vb\_cmpn\_cmd\_x - Vb\_estm1\_x) - Kth\_x \cdot \theta b\_act\_x - Kw\_x \cdot \omega b\_act\_x \quad (4a)$$

$$DVw1\_cmd\_y = Kvb\_r(Vb\_cmpn\_cmd\_y - Vb\_estm1\_y) - Kth\_y \cdot \theta b\_act\_y - Kw\_y \cdot \omega b\_act\_y \quad (4b)$$

Kvb_xy, Kth_xy, and Kw_xy in Equations (4a) and (4b) are a predetermined gain value set in advance.

In addition, a first term on the right side of Equation (4a) is a feedback operation amount component corresponding to a deviation between the target velocity Vb_cmpn_cmd_x (latest value) after center-of-gravity offset compensation in the X-axis direction of the center of gravity of the whole of the vehicle system and the first estimated value Vb_estm1_x (latest value). A second term on the right side of Equation (4a) is a feedback operation amount component corresponding to the measured value (latest value) of the actual angle of inclination θb_act_x in the direction about the Y-axis of the occupant boarding member 5. A third term on the right side of Equation (4a) is a feedback operation amount component corresponding to the measured value (latest value) of the actual inclination angular velocity ωb_act_x in the direction about the Y-axis of the occupant boarding member 5. The target translational acceleration DVw1_cmd_x in the X-axis direction is calculated as a composite operation amount of these feedback operation amount components.

Similarly, a first term on the right side of Equation (4b) is a feedback operation amount component corresponding to a deviation between the target velocity Vb_cmpn_cmd_y (latest value) after center-of-gravity offset compensation in the Y-axis direction of the center of gravity of the whole of the vehicle system and the first estimated value Vb_estm1_y (latest value). A second term on the right side of Equation (4b) is a feedback operation amount component corresponding to the measured value (latest value) of the actual angle of inclination θb_act_y in the direction about the X-axis of the occupant boarding member 5. A third term on the right side of Equation (4b) is a feedback operation amount component corresponding to the measured value (latest value) of the actual inclination angular velocity ωb_act_y in the direction about the X-axis of the occupant boarding member 5. The target translational acceleration DVw1_cmd_y in the Y-axis direction is calculated as a composite operation amount of these feedback operation amount components.

The attitude control arithmetic section 34 next determines the first target velocity Vw1_cmd_xy (latest value) of the first moving operation unit 3 by integrating each component of the target translational acceleration DVw1_cmd_xy by the integrating arithmetic section 34a.

The first control processing section 24 then controls the electric motors 8a and 8b as the first actuator device 8 of the first moving operation unit 3 according to the first target velocity Vw1_cmd_xy determined as described above.

More specifically, the first control processing section 24 determines current command values for the respective electric motors 8*a* and 8*b* by feedback control processing so as to make the actual rotational speeds (measured values) of the respective electric motors 8*a* and 8*b* follow the target values for the rotational speeds of the respective electric motors 8*a* and 8*b* which target values are defined by the first target velocity Vw1_cmd_xy, and passes currents through the respective electric motors 8*a* and 8*b* according to the current command values.

With the above-described processing, in a state in which the after-limitation center-of-gravity target velocity Vb_cmd_xy is a constant value, the movement of the vehicle 1 is stabilized, and the vehicle 1 moves in a straight line at a constant speed, the center of gravity of the whole of the vehicle system is present directly above the grounded point of the first moving operation unit 3. In this state, the actual angle of inclination θb_act_xy of the occupant boarding member 5 is −Ofst_xy/(h−r_xy) from Equations (1b) and (2b). In addition, the actual inclination angular velocity ωb_act_xy of the occupant boarding member 5 is zero, and the target translational acceleration DVw1_cmd_xy is zero. From this and the block diagram of FIG. 8, a fact that the estimated value Vb_estm1_xy and the target velocity Vb_cmd_xy coincide with each other is derived.

That is, the first target velocity Vw1_cmd_xy of the first moving operation unit 3 is basically determined so as to converge the deviation between the after-limitation center-of-gravity target velocity Vb_cmd_xy of the center of gravity of the whole of the vehicle system and the first estimated value Vb_estm1_xy to zero.

In addition, the respective rotational speeds of the electric motors 8*a* and 8*b* as the first actuator device 8 of the first moving operation unit 3 are controlled so as not to deviate from the predetermined allowable range by the processing of the processing section 32*e* while compensation is made for the effect of the offset of the position of the center of gravity of the whole of the vehicle system from the position of the reference part Ps_xy in the inverted pendulum model.

The above is details of the processing of the first control processing section 24 in the present embodiment.

The processing of the second control processing section 25 will next be described with reference to FIG. 13. Giving an outline of the processing of the second control processing section 25, in conditions in which the basic turning angular velocity command ωjs determined by the operating command converting section 31 is zero (conditions in which the first horizontal slide command Js_y is zero or substantially zero), the second control processing section 25 determines a second target velocity Vw2_cmd_y as a target value for the moving velocity (translational velocity) in the Y-axis direction of the second moving operation unit 4 so as to coincide with the first target velocity Vw1_cmd_y in the Y-axis direction of the first moving operation unit 3 in order to make the translational movement of the vehicle 1 performed.

In addition, in conditions in which the basic turning angular velocity command ωjs is not zero, the second control processing section 25 determines the second target velocity Vw2_cmd_y in the Y-axis direction of the second moving operation unit 4 so as to be different from the first target velocity Vw1_cmd_y in the Y-axis direction of the first moving operation unit 3 in order to make the turning of the vehicle 1 performed.

Specifically, such processing of the second control processing section 25 is performed as follows. Referring to FIG. 13, the second control processing section 25 first performs the processing of an arithmetic section 42. The arithmetic section 42 determines a basic relative velocity command Vjs2_y as a command value for the relative velocity in the Y-axis direction of the second moving operation unit 4 with respect to the first moving operation unit 3 to make the turning of the vehicle 1 performed at the angular velocity of the basic turning angular velocity command ωjs, by multiplying the basic turning angular velocity command ωjs by a value obtained by multiplying a distance L (predetermined value) in the X-axis direction between the first moving operation unit 3 and the second moving operation unit 4 by a value of "−1."

The second control processing section 25 next determines the second target velocity Vw2_cmd_y in the Y-axis direction of the second moving operation unit 4 by performing a process of adding the basic relative velocity command Vjs2_y (latest value) to the first target velocity Vw1_cmd_y (latest value) in the Y-axis direction of the first moving operation unit 3, the first target velocity Vw1_cmd_y being determined by the first control processing section 24, in an arithmetic section 43.

Figure 13:
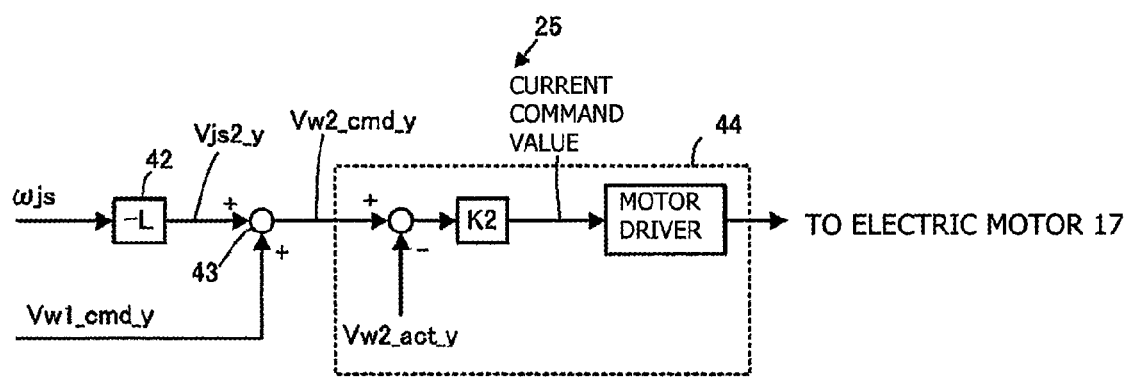
FIG. 13 is a block diagram showing the processing of a second control processing section shown in FIG. 3.

As shown in an arithmetic section 44 in FIG. 13, the second control processing section 25 next controls the current of the electric motor 17 as the second actuator device (in turn the driving force of the second moving operation unit 4) such that a present actual moving velocity Vw2_act_y in the Y-axis direction of the second moving operation unit 4 follows the second target velocity Vw2_cmd_y (latest value).

Specifically, a current command value Iw2_cmd for the electric motor 17 is determined by the operation of the following Equation (5), and further the actual current of the electric motor 17 is controlled to the current command value Iw2_cmd by a motor driver.

$$Iw2\_cmd = K2 \cdot (Vw2\_cmd\_y - Vw2\_act\_y) \quad (5)$$

K2 in Equation (5) is a predetermined gain value set in advance.

In addition, used as the value of the present actual moving velocity Vw2_act_y in the present embodiment is a value estimated from the detected value of the rotational speed of the electric motor 17 (detected value detected by a rotational speed sensor such as a rotary encoder or the like not shown in the figures).

A deviation between the target value for the rotational speed of the electric motor 17 which target value is defined by the second target velocity Vw2_cmd_y and the measured value of the rotational speed may be used in place of Vw2_cmd_y−Vw2_act_y in Equation (5).

With the above-described control processing of the second control processing section 25, in conditions in which no turning command is output from the portable telephone 27 (conditions in which the basic turning angular velocity command ωjs is zero), the second target velocity Vw2_cmd_y is determined so as to coincide with the first target velocity Vw1_cmd_y (latest value) in the Y-axis direction of the first moving operation unit 3.

In addition, in conditions in which a turning command is output from the portable telephone 27 (in conditions in which the basic turning angular velocity command ωjs is not zero), the second target velocity Vw2_cmd_y is determined to be a value obtained by adding the basic relative velocity command Vjs2_y (latest value) determined according to the basic turning angular velocity command ωjs to the first target velocity Vw1_cmd_y (latest value) in the Y-axis direction of the first moving operation unit 3. That is, the second target velocity Vw2_cmd_y is determined so as to coincide with Vw1_cmd_y+Vjs2_y.

Therefore, the second target velocity Vw2_cmd_y is determined to be a velocity value different from the first target velocity Vw1_cmd_y in the Y-axis direction of the first moving operation unit 3 so that the turning of vehicle 1 is performed.

More specifically, when a turning command from the portable telephone 27 is a command to turn the vehicle 1 to the right (clockwise direction) (when the basic turning angular velocity command ωjs represents an angular velocity in the clockwise direction), the basic relative velocity command Vjs2_y is a velocity in the left direction.

At this time, when the first target velocity Vw1_cmd_y in the Y-axis direction of the first moving operation unit 3 is a velocity in the left direction, the second target velocity Vw2_cmd_y in the Y-axis direction of the second moving operation unit 4 is a velocity in the left direction and of a magnitude larger than that of the first target velocity Vw1_cmd_y.

In addition, when a turning command from the portable telephone 27 is a command to turn the vehicle 1 to the right (clockwise direction), and the first target velocity Vw1_cmd_y in the Y-axis direction of the first moving operation unit 3 is a velocity in the right direction, the second target velocity Vw2_cmd_y in the Y-axis direction of the second moving operation unit 4 is a velocity in the right direction and of a magnitude smaller than that of the first target velocity Vw1_cmd_y, or a velocity in an opposite direction (left direction) from the first target velocity Vw1_cmd_y.

On the other hand, when a turning command from the portable telephone 27 is a command to turn the vehicle 1 to the left (counterclockwise direction) (when the basic turning angular velocity command ωjs represents an angular velocity in the counterclockwise direction), the basic relative velocity command Vjs2_y is a velocity in the right direction.

At this time, when the first target velocity Vw1_cmd_y in the Y-axis direction of the first moving operation unit 3 is a velocity in the right direction, the second target velocity Vw2_cmd_y in the Y-axis direction of the second moving operation unit 4 is a velocity in the right direction and of a magnitude larger than that of the first target velocity Vw1_cmd_y.

In addition, when a turning command from the portable telephone 27 is a command to turn the vehicle 1 to the left (counterclockwise direction), and the first target velocity Vw1_cmd_y in the Y-axis direction of the first moving operation unit 3 is a velocity in the left direction, the second target velocity Vw2_cmd_y in the Y-axis direction of the second moving operation unit 4 is a velocity in the left direction and of a magnitude smaller than that of the first target velocity Vw1_cmd_y, or a velocity in an opposite direction (right direction) from the first target velocity Vw1_cmd_y.

In addition, as described above, in the present embodiment, when a point in the first operating region 27b and a point in the second operating region 27d are touched simultaneously, the steering program 29 determines that the touching of only an operating region touched first is valid, and determines that the touching of an operating region touched later is invalid.

That is, in a case where a point in the second operating region 27d (specifically the second pointer 27e) is touched, even when the second pointer 27e is not slid (that is, even when the second horizontal slide command Js2_y is zero), the operation of the first pointer 27c is determined to be invalid. Therefore, in this case, the first vertical slide command Js_x and the first horizontal slide command Js_y are both zero.

Thus, in the case where a point in the second operating region 27d is touched, the basic turning angular velocity command ωjs is not output from the operating command converting section 31. Therefore, in this case, the second target velocity Vw2_cmd_y is determined so as to coincide with the first target velocity Vw1_cmd_y, and the control device 21 controls the first actuator device 8 and the second actuator device (electric motor 17) so as not to cause the turning behavior of the vehicle 1.

Thus, in a case of moving in a left or right direction along a wall decorated with viewing objects such as pictures or the like in a state of facing the wall, for example, the vehicle 1 can be moved so as not to cause turning behavior.

The above is details of the processing of the second control processing section 25.

The steering program may be configured to "transmit a notification that the second pointer 27e is touched as information from the portable telephone 27 to the vehicle 1 when the second pointer 27e is touched," and the control device 21 may be configured to "switch to a process of setting the second target velocity Vw2_cmd_y to the same as the first target velocity Vw1_cmd_y, which process is different from the process shown in FIG. 13, when the second pointer 27e is touched."

In addition, the control device 21 estimates the center-of-gravity offset amount estimated value Ofst_estm_xy in the center-of-gravity offset estimating section 35a. The control device 21 includes this center-of-gravity offset amount estimated value Ofst_estm_xy in at least vehicle information, and transmits the center-of-gravity offset amount estimated value Ofst_estm_xy to the portable telephone 27 via the communicating section 26. In the present embodiment, the center-of-gravity offset amount estimated value Ofst_estm_xy corresponds to "information on movement of the occupant boarding member" in the present invention. Incidentally, the center-of-gravity offset amount estimated value Ofst_estm_xy indicates the position of the center of gravity as a relative position from a predetermined reference, and in effect indicates the position of the center of gravity (center of gravity of the whole of the vehicle 1 and the occupant boarded on the occupant boarding member 5).

The portable telephone 27 displays the center-of-gravity display point 27f in the first operating region 27b according to the center-of-gravity offset amount estimated value Ofst_estm_xy. When the center-of-gravity offset amount estimated value Ofst_estm_x in the X-axis direction and the center-of-gravity offset amount estimated value Ofst_estm_y in the Y-axis direction are both zero, the center-of-gravity display point 27f is displayed at an intersection of the first guide line 27x and the second guide line 27y (which intersection will hereinafter be referred to as an "initial position") (that is, displayed at the same position as the point at which the first pointer 27c is displayed when not operated).

When the center-of-gravity offset amount estimated value Ofst_estm_x in the X-axis direction is a positive value (when the center of gravity is offset in the forward direction), the center-of-gravity display point 27f is displayed in a state of being offset from the initial position to an upper side by a distance corresponding to the value. When the center-of-gravity offset amount estimated value Ofst_estm_x in the X-axis direction is a negative value (when the center of gravity is offset in the rearward direction), the center-ofgravity display point 27f is displayed in a state of being offset from the initial position to a lower side by a distance corresponding to the value.

When the center-of-gravity offset amount estimated value Ofst_estm_y in the Y-axis direction is a positive value (when the center of gravity is offset in the left direction), the center-of-gravity display point 27f is displayed in a state of being offset from the initial position to a left side by a distance corresponding to the value. When the center-of-gravity offset amount estimated value Ofst_estm_y in the Y-axis direction is a negative value (when the center of gravity is offset in the right direction), the center-of-gravity display point 27f is displayed in a state of being offset from the initial position to a right side by a distance corresponding to the value.

The distances by which to offset the center-of-gravity display point 27f from the initial position according to these estimated values Ofst_estm_xy are determined according to a predetermined table or the like.

Figure 14A:
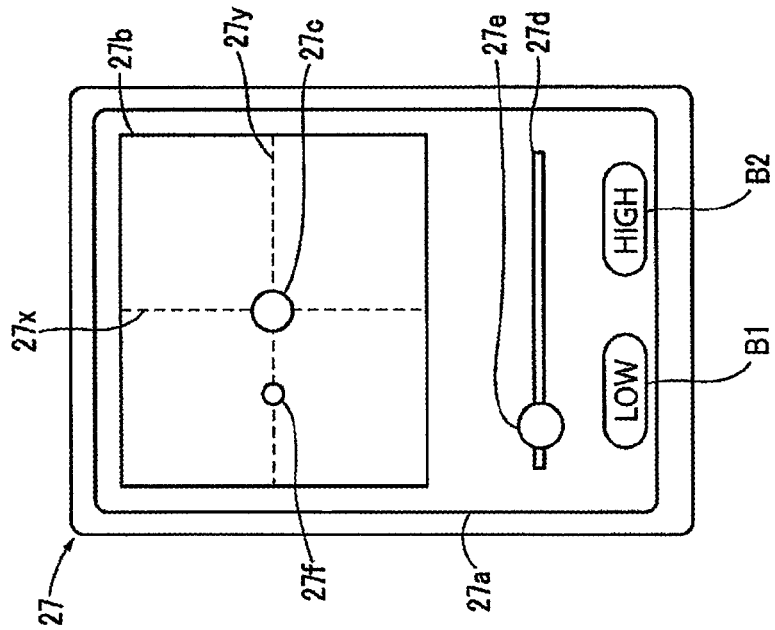
FIG. 14A is diagram showing display of the position of a center of gravity according to the illustrative embodiment depicting a first pointer slid in an upper right direction.

For example, as shown in FIG. 14A, when the first pointer 27c is slid in an upper right direction, the vehicle 1 moves in the forward direction and turns clockwise. The position of the center of gravity which position varies accordingly (varies in the positive direction of the X-axis direction and the negative direction of the Y-axis direction) is therefore displayed as the center-of-gravity display point 27f at a position in the upper right direction from the initial position.

Figure 14B:
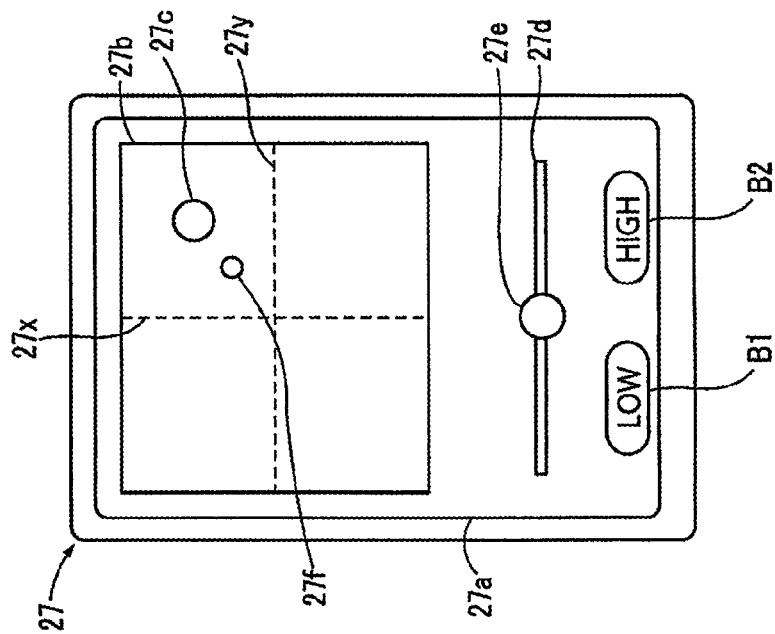
FIG. 14B is diagram showing display of the position of a center of gravity according to the illustrative embodiment depicting a second pointer slid in a left direction.

In addition, as shown in FIG. 14B, when the second pointer 27e is slid in the left direction, the vehicle 1 moves in the left direction. The position of the center of gravity which position varies accordingly (varies in the positive direction of the Y-axis direction) is therefore displayed as the center-of-gravity display point 27f at a position in the left direction from the initial position.

Thus, the position of the center of gravity is notified to the occupant via the display section 27a according to the center-of-gravity offset amount estimated value Ofst_estm_xy as information on movement of the occupant boarding member 5 in a "case where the vehicle 1 travels," a "case where the occupant tilts the occupant boarding member 5," or the like. An effect is thereby obtained in that the occupant can learn how the position of the center of gravity (specifically the center-of-gravity offset amount estimated value Ofst_estm_xy) changes in various travelling states.

When the occupant thereafter moves the occupant boarding member 5 by tilting operation, it suffices for the occupant to steer the vehicle 1 in such a manner as to coincide with information notified at a time of operation of the operating device. At this time, even if the tilting operation is not performed well, the position of the center of gravity resulting from the tilting operation is displayed as the center-of-gravity display point 27f on the display section 27a. This enables a comparison to be made to determine how the movement of the center-of-gravity display point 27f by the tilting operation differs from the movement of the center-of-gravity display point 27f when the pointers 27c and 27e are slid. The occupant can also learn how to steer the inverted pendulum type vehicle by the comparison at this time.

In addition, in the present embodiment, the center-of-gravity display point 27f is displayed in the first operating region 27b. Thus, because the occupant views the display section 27a to operate the first pointer 27c or the second pointer 27e, the occupant can view changes in the center-of-gravity display point 27f that changes according to the operation together with the operation. Thus, the occupant does not need to greatly move a line of sight when alternately "viewing the operating device for operation" and "viewing information on movement of the occupant boarding member 5." Therefore the convenience of the operating device and the notifying section can be improved.

Next, a low-speed mode and a high-speed mode as moving modes of the vehicle 1 are described. There may be for example a desire to move at a slow speed when moving while viewing something, and to move fast when moving quickly to a destination.

Accordingly, in the present embodiment, to improve the convenience of the steering program 29, the steering program 29 is configured to be able to selectively perform a plurality of moving modes (the low-speed mode and the high-speed mode) so that even when the pointers 27c and 27e are operated by a same amount of slide, the magnitudes of the respective slide commands Js_x, Js_y, and Js2_y output according to the amount of slide can be changed.

More specifically, when the slide commands Js_x, Js_y, and Js2_y are set, in a case where the low-speed moving mode is selected as a moving mode, the slide commands Js_x, Js_y, and Js2_y corresponding to amounts of slide of the first pointer 27c and the second pointer 27e are set smaller than in a case where the high-speed moving mode is selected. In the case where the high-speed moving mode is selected as a moving mode, the slide commands Js_x, Js_y, and Js2_y corresponding to amounts of slide of the first pointer 27c and the second pointer 27e are set larger than in the case where the low-speed moving mode is selected.

Thus, the magnitudes of the commands Js_x, Js_y, and Js2_y corresponding to the same amount of slide are changed, and the values of the first target velocity Vw1_cmd_xy and the second target velocity Vw2_cmd_xy determined by the control device 21 of the vehicle 1 are consequently changed. Thus, the occupant can perform operation comfortably by selecting a moving mode as appropriate according to a situation.

Such a configuration of the steering program 29 corresponds to being "configured to be able to selectively perform processing in a plurality of kinds of forms for generating the command" in the present invention.

Incidentally, the range of a dead zone may be increased or decreased according to each mode. This enables the vehicle 1 to start moving slowly (not to start moving easily) in a case of a wide dead zone, and enables the vehicle 1 to start moving quickly in a case of a narrow dead zone.

In addition, the vehicle information in the present embodiment includes not only the above-described position of the center of gravity of the whole of the vehicle system (estimated value Ofst_estm_xy thereof) but also for example the estimated value Vb_estm1_xy of the velocity of the center of gravity of the whole of the vehicle system, the actual angle of inclination θb_act_xy, and the like. The steering program 29 of the portable telephone 27 is configured to notify these pieces of vehicle information to the occupant as appropriate. For example, the steering program 29 notifies the estimated value Vb_estm1_xy of the velocity of the center of gravity of the whole of the vehicle system as the velocity of the vehicle 1 (for example makes display at a predetermined position of the display section 27a or reproduces sound), or notifies the actual angle of inclination θb_act_xy. The occupant can thereby grasp the state of the vehicle or the like as appropriate.

The moving velocity in the left-right direction of the first moving operation unit 3 and the second moving operation unit 4 of the vehicle 1 may be controlled so as to turn the vehicle 1 as appropriate according to the movement of the center of gravity of the occupant in the left-right direction (or in turn the tilting of the occupant boarding member 5 in the direction about the X-axis). For example, when the center-of-gravity offset amount estimated value Ofst_estm_y in the Y-axis direction, the magnitude of the center-of-gravity offset effect amount Vofs_y, the magnitude of the target value Vw1_cmd_y for the moving velocity in the Y-axis direction of the first moving operation unit 3, or the like becomes a predetermined value or larger, the occupant may be considered to be requesting the turning of the vehicle 1, and the moving velocity in the left-right direction of the first moving operation unit 3 and the second moving operation unit 4 of the vehicle 1 may be controlled so as to turn the vehicle 1.

In addition, in the present embodiment, the second operating region 27d is formed in a region of a bar shape, and is configured to allow operation in only the horizontal direction. However, the present invention is not limited to this. For example, as shown in FIG. 15, the second operating region 27d may be provided in substantially the shape of a square as with the first operating region 27b, and may be configured to allow operation in both of the vertical direction and the horizontal direction. In this case, when the second pointer 27e is operated in the vertical direction, the steering program 29 outputs an operation signal corresponding to an amount of slide in the vertical direction of the second pointer 27e as a command (which command will hereinafter be referred to as a "second vertical slide command") Js2_x for moving the vehicle 1 forward or rearward, as in the first operating region 27b. The slide operation in the horizontal direction of the second pointer 27e is similar to that of the present embodiment.

Then, it suffices to transmit the second vertical slide command Js2_x to the vehicle 1 side, and determine the basic velocity command Vjs_x in the X-axis direction according to one of the first vertical slide command Js_x and the second vertical slide command Js2_x in the operating command converting section 31.

In addition, the second operating region 27d may be provided in substantially the shape of a square, and the first operating region 27b may be provided in a region having the shape of a bar long in the horizontal direction (that is, commands are generated so that movement in the X-axis direction and the Y-axis direction is performed by the operation of the second operating region 27d, and commands are generated so that the turning of the vehicle about the yaw axis is performed by the operation of the first operating region 27b).

Further, in the present embodiment, the positions of the first pointer 27c and the second pointer 27e when the pointers 27c and 27e are not operated are determined. However, instead of the pointers 27c and 27e being configured in this manner, when a predetermined point in the first operating region and the second operating region is touched, the predetermined point may be set as a point at which sliding is started. In this case, a reference point, which is a point changed from a state of not being touched to a state of being touched in an operating region to perform slide operation, is set as a reference, and commands (Js_x, Js_y, and Js2_y) are generated according to a change (a direction and an amount of slide) from the reference point to an operation point as a point after the slide operation is performed.

To make description by taking the first operating region 27b as an example, when the first operating region 27b is not touched, the first pointer 27c or the like is not displayed. When a predetermined point in the first operating region 27b is touched to perform slide operation, the first pointer 27c or the like is displayed. Then, the first pointer 27c is moved to an operation point as a point after the slide operation is performed. At this time, the center-of-gravity display point 27f is displayed in the central part of the first operating region 27b.

In the case of the configuration as described above, the first vertical slide command Js_x and the first horizontal slide command Js_y are determined according to the direction of the operation point with respect to the starting point and an amount of slide as in the present embodiment. When the operating device is thus configured, slide operation can be started without the operating device being viewed, so that the operability of the operating device can be improved.

Figure 16:
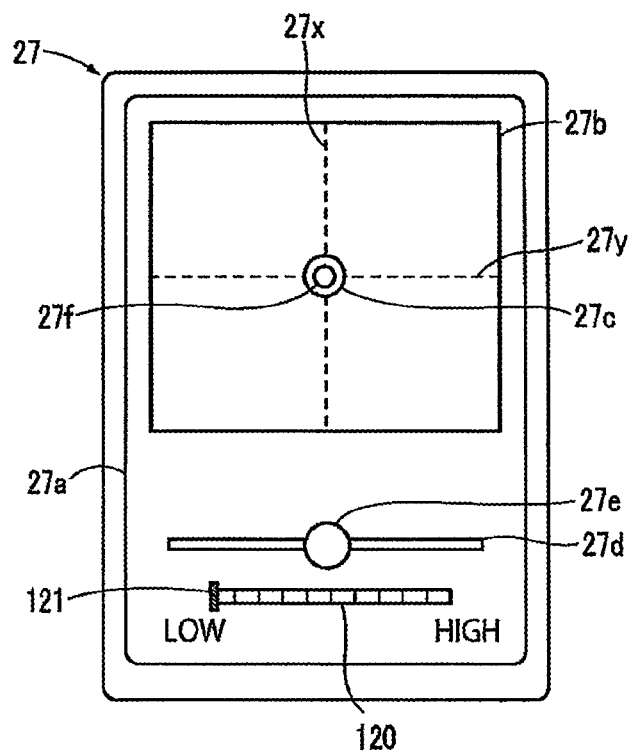
FIG. 16 is a diagram showing a display section when yet another form of steering program is executed.

Further, in the present embodiment, the display section 27a may be configured as shown in FIG. 16. In FIG. 16, a level changing region 120 as a region having the shape of a bar long in the horizontal direction is disposed in the position where the low-speed mode button B1 and the high-speed mode button B2 are arranged in the present embodiment. A slider 121 is displayed on the level changing region 120.

The slider 121 is slid after being touched by the occupant, and thereby moves (slides) on the level changing region 120. As a result of being slid, the slider 121 is displayed at 10 different positions in the horizontal direction on the level changing region 120. A state of the slider 121 being displayed at a leftmost position of the level changing region 120 (which position will hereinafter be referred to as a "first level selection position") is defined as a first level selection state. A state of the slider 121 being displayed at a rightmost position of the level changing region 120 (which position will hereinafter be referred to as a "tenth level selection position") is defined as a tenth level selection state. Incidentally, as for cases where the slider 121 is displayed at the eight remaining positions, when a position counted from the first level selection position is "n," the position is defined as an "nth level selection position," and a state of the position being selected is defined as an "nth level selection state."

FIG. 16 shows the display section 27a in the first level selection state in which the slider 121 is disposed at the first level selection position.

The steering program 29 sets each gain in the above-described control to increase as the slider 121 approaches the tenth level selection position from the first level selection position (as the slider 121 approaches the tenth level selection state from the first level selection state). This makes the reaction of the vehicle 1 to the tilting of the occupant boarding member 5 increase as the slider 121 approaches the tenth level selection position from the first level selection position.

Therefore, when the first level selection state is set for an occupant not accustomed to the steering of the vehicle 1 such as a beginner or the like, the occupant can become accustomed to the steering of the vehicle 1 in a state of the reaction of the vehicle 1 to the tilting of the occupant boarding member 5 being decreased. Incidentally, the first level selection state is not limited only to beginners, but may also be used in a case where movement is made in the left-right direction along a wall decorated with viewing objects, for example.

On the other hand, when the tenth level selection state or a state close to the tenth level selection state is set for an occupant skilled in the steering of the vehicle 1, the reaction of the vehicle 1 to the tilting of the occupant boarding member 5 is increased, and the reaction of the vehicle 1 to steering is increased, so that agile steering can be performed.

Thus, it suffices to select the tenth level selection state in a case where quick movement to a destination is desired, for example.

As described above, the controllability of the vehicle 1 can be improved by adjusting each gain finely according to an "environment in which the vehicle 1 is used" or the "degree of skillfulness of the occupant in the steering of the vehicle 1." Incidentally, while the 10 levels are provided in this example, the number of levels may be smaller than 10 or equal to or larger than 11.

In addition, in the present embodiment, the center-of-gravity offset amount estimated value Ofst_estm_xy is used as "information on movement of the occupant boarding member." However, the present invention is not limited to this. The angle of inclination of the occupant boarding member 5 with respect to the vertical direction may be used as the information on movement of the occupant boarding member. That is, the actual angle of inclination θb_act_xy which angle is measured by the inclination sensor 22 may be used as the information on movement of the occupant boarding member.

In this case, when the angle of inclination θb_act_x in the X-axis direction is a positive value (inclination in the forward direction), a point indicating the magnitude of the inclination (which point will hereinafter be referred to as an "inclination display point") is displayed in a state of being offset from the initial position to the upper side by a distance corresponding to the value. When the angle of inclination θb_act_x in the X-axis direction is a negative value (inclination in the rearward direction), the inclination display point is displayed in a state of being offset from the initial position to the lower side by a distance corresponding to the value.

When the angle of inclination θb_act_y in the Y-axis direction is a positive value (inclination in the left direction), the inclination display point is displayed in a state of being offset from the initial position to the left side by a distance corresponding to the value. When the angle of inclination θb_act_y in the Y-axis direction is a negative value (inclination in the right direction), the inclination display point is displayed in a state of being offset from the initial position to the right side by a distance corresponding to the value.

The distances by which to offset the inclination display point from the initial position according to these estimated values θb_act_xy are determined according to a predetermined table or the like.

This also provides an effect in that the occupant can learn how the angle of inclination θb_act_xy changes in various travelling states.

Incidentally, instead of the center-of-gravity display point 27f or the inclination display point being displayed in the first operating region 27b, a region in which to display the center-of-gravity display point 27f or the inclination display point may be provided in another position of the display section 27a, and the center-of-gravity display point 27f or the inclination display point may be displayed in that region.

In addition, in the present embodiment, the notifying section is provided to the operating device. However, the notifying section and the operating device may be provided separately from each other. For example, the notifying section may be formed by a large-screen display disposed in front of the vehicle 1.

In addition, in the present embodiment, the notifying section is formed by a display device having a touch panel. However, the present invention is not limited to this. For example, the notifying section may be configured to notify the information on movement of the occupant boarding member 5 by sound or the like. That is, there are various notifying methods such as notifying the position of the center of gravity of the whole or the angle of inclination by voice, for example. In addition, the notifying section may be formed by a combination of a few methods. For example, the notifying section may be configured to make display on the display device and reproduce sound from a speaker.

In addition, in the present embodiment, the portable telephone 27 (specifically the first communicating section 271) and the vehicle 1 (specifically the communicating section 26) are connected to each other by radio. However, the present invention is not limited to this. The portable telephone 27 (specifically the first communicating section 271) and the vehicle 1 (specifically the communicating section 26) may be connected to each other by wire. In addition, in the present embodiment, the portable telephone 27 as a portable type terminal is used as the operating device. However, the present invention is not limited to this. For example, the operating device may be formed integrally with the vehicle 1. For example, the operating device may be attached to one of the holding members 10 and 10.

Further, the operating device may be formed by, in place of the touch panel, two joysticks, that is, a joystick for outputting at least a command to turn the vehicle 1 and a joystick for outputting at least a command to move the vehicle 1 in the left-right direction. The operating device is not limited to joysticks, but various other interface devices for operation can be used.

In addition, in the present embodiment, the slide commands Js_x, Js_y, and Js2_y are generated by sliding the first pointer 27c and the second pointer 27e. However, the present invention is not limited to this. For example, the portable telephone 27 may include a six-axis acceleration sensor, so that the orientation of the portable telephone 27 when the portable telephone 27 is held up is estimated from the output of the sensor, and the slide commands Js_x, Js_y, and Js2_y are generated so as to move the vehicle 1 in the direction of the orientation.

Furthermore, in a portable telephone 27 having a camera function, when a part of an image being photographed by a camera is tapped, a direction and a distance to the tapped position, for example, may be estimated by image analysis or the like, and the slide commands Js_x, Js_y, and Js2_y may be generated so as to move the vehicle 1 to the position.

Also, the steering program 29 may be configured such that two screens, that is, a first screen and a second screen, can be selected and displayed as the screen displayed on the display section 27a. In this case, the first screen is a screen for performing the translation or the turning of the vehicle 1 by the pointers 27c and 27e, and the second screen is a screen mainly for changing the above-described level by the operation of a slider as illustrated in FIG. 16 or the like.

Figure 17:
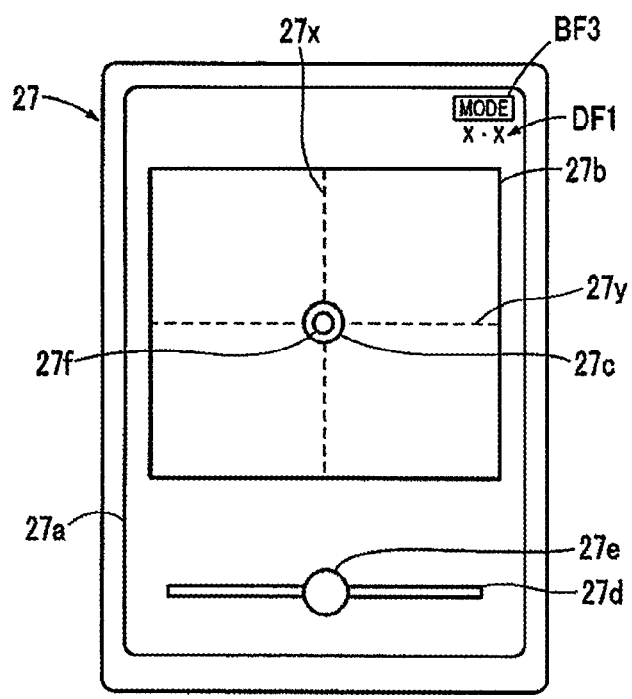
FIG. 17 is a diagram showing a display section when a form of steering program in which predetermined operation is specified is executed.

FIG. 17 shows an example in which the display section 27a is displaying the first screen. The display of the display section 27a shown in FIG. 17 is different from the display of the display section 27a in the present embodiment (display shown in FIG. 4) in that the low-speed mode button B1 and the high-speed mode button B2 are not present and a mode button BF3 and a level value display part DF1 are added.

Figure 18:
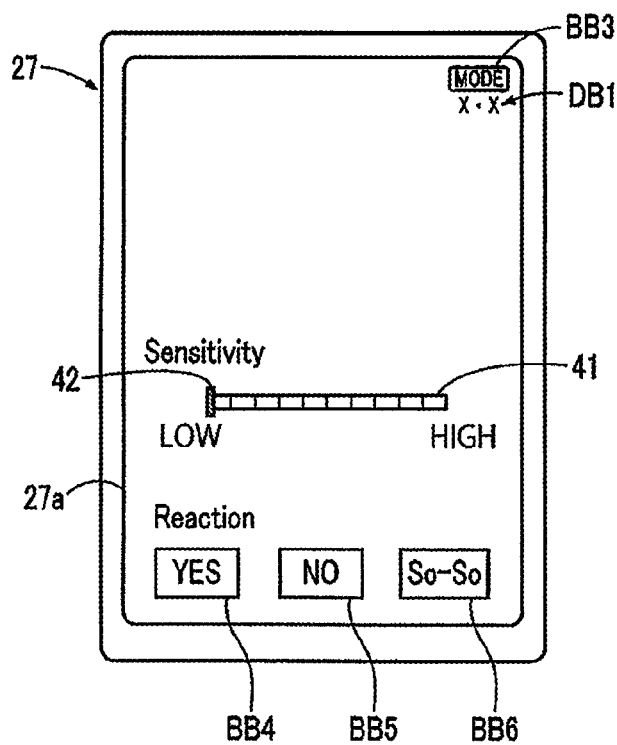
FIG. 18 is a diagram showing the display section when a mode button is touched in the form of FIG. 17.

When the mode button BF3 is touched, the steering program 29 makes a transition to the second screen as shown in FIG. 18. In addition, the steering program 29 displays the numerical value of the level selected on the second screen in the level value display part DF1.

As shown in FIG. 18, the second screen displays a mode button BB3 and a level value display part DB1 in an upper part of the display section 27a in a similar manner to the mode button and the level value display part displayed on the first screen. When the mode button BB3 is touched on the second screen, the steering program 29 changes the display of the display section 27a to the first screen.

In addition, the second screen displays a level changing region 41 and a slider 42 in the central part of the display section 27a. The level changing region 41 and the slider 42 are the same as the level changing region 120 and the slider 121 shown in FIG. 16, and therefore detailed description thereof will be omitted. As with the level value display part DF1 on the first screen, the level value display part DB1 on the second screen displays the numerical value of the level selected by the slider 42. Incidentally, the level value display parts DF1 and DB1 may be configured to display for example a numerical value, a character string, a symbol, or the like corresponding to the selected level rather than the numerical value of the level.

Since the low-speed mode button B1 and the high-speed mode button B2 are not present on the first screen as described above, erroneously operating the low-speed mode button B1 and the high-speed mode button B2 while operating the first pointer 27c or the second pointer 27e can be prevented, and the vehicle 1 can be prevented from exhibiting behavior not intended by the occupant. Similarly, because the slider 121 shown in FIG. 16 is not present on the first screen shown in FIG. 17 either, erroneously operating the slider 121 while operating the first pointer 27c or the second pointer 27e can be prevented, and the vehicle 1 can be prevented from exhibiting behavior not intended by the occupant.

In addition, either of the first screen and the second screen displays the level selected by the slider 42 in the level value display part DF1 or DB1. The occupant can thereby grasp the currently set level even when performing operation on either of the first screen and the second screen.

Further, in the example shown in FIG. 18, the steering program 29 displays buttons for outputting commands for making predetermined motions defined in advance on the second screen. Specifically, the second screen displays a YES button BB4, a NO button BB5, and a So-So button BB6 in a lower part of the display section 27a. When the YES button BB4 is touched, the steering program 29 makes a first motion (to be described later in detail). When the NO button BB5 is touched, the steering program 29 makes a second motion (to be described later in detail). When the So-So button BB6 is touched, the steering program 29 makes a third motion (to be described later in detail).

The first motion is such that after the vehicle 1 is moved slightly (for example by about 5 [cm]) rearward along the X-axis direction, a motion of "swinging the occupant boarding member 5 forward about the Y-axis and making the angle of inclination 0° (motion as of a nod)" is made twice. The vehicle 1 thus operates as if to nod. The second motion is such that a motion of turning by predetermined degrees (for example about 10° to 15°) with the grounded point of the first moving operation unit 3 as a center is made both ways counterclockwise and clockwise twice. The vehicle 1 thus operates as if a human shook his/her head. The third motion is such that the vehicle 1 moves in the left-right direction both ways by a predetermined distance twice. The vehicle 1 thus operates as if worrying.

When the steering program 29 is configured as described above, the vehicle 1 can be made to perform the predetermined motions (the first motion, the second motion, and the third motion) by performing only simple operation of touching the buttons (BB4, BB5, and BB6) as compared with the case where the vehicle 1 is made to perform the predetermined motions by operation through the first pointer 27c or the second pointer 27e.

In addition, when the vehicle 1 is made to perform a motion close to a motion of a human such as a nod or the like as illustrated in the above, the vehicle 1 can be set as a character such as a mascot or the like.

While an example of the first motion, the second motion, and the third motion as predetermined motions has been shown above, the predetermined motions may be other motions than the above-described motions.

Also, the motions are to be made by the vehicle as a mascot when no occupant is boarded.

In addition, the configuration of the vehicle 1 according to the present embodiment may further include a seat sensor for detecting that an occupant is boarded on the occupant boarding member 5. When the seat sensor detects that an occupant is boarded on the occupant boarding member 5, and the mode button BF3 is touched on the first screen shown in FIG. 17, switching may be made to a second screen shown in FIG. 19 rather than the second screen shown in FIG. 18.

Figure 19:
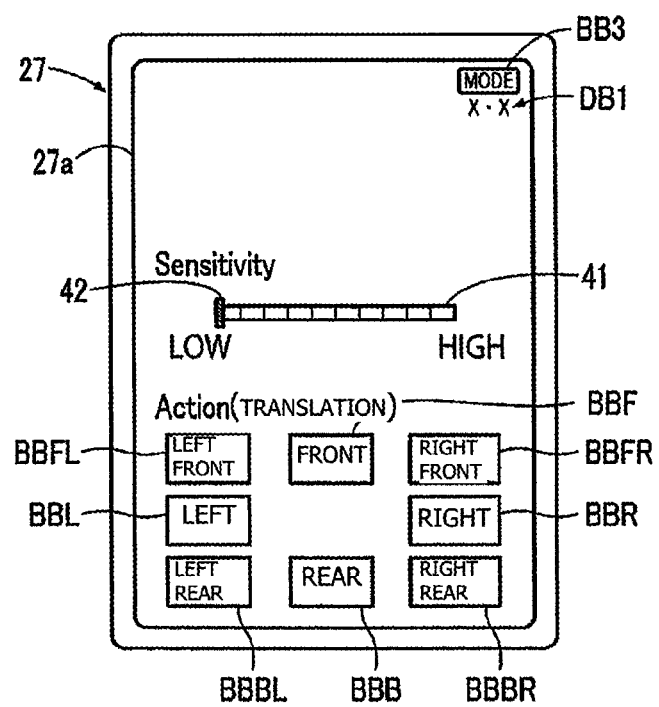
FIG. 19 is a diagram showing a display section when another form of steering program than in FIG. 18 is executed.

The second screen shown in FIG. 19 is different from the second screen shown in FIG. 18 in that the second screen shown in FIG. 19 does not have the YES button BB4, the NO button BB5, nor the So-So button BB6, but instead displays eight translation buttons for making the vehicle 1 perform translational movements (a translation button BBF for translation in a forward direction, a translation button BBB for translation in a rearward direction, a translation button BBL for translation in a left direction, a translation button BBR for translation in a right direction, a translation button BBFL for translation in a left forward direction, a translation button BBFR for translation in a right forward direction, a translation button BBBL for translation in a left rearward direction, and a translation button BBBR for translation in a right rearward direction).

The steering program 29 outputs a command for moving the vehicle 1 at a predetermined velocity in the forward direction while the translation button BBF for translation in the forward direction is touched. The steering program 29 outputs a command for moving the vehicle 1 at a predetermined velocity in the rearward direction while the translation button BBB for translation in the rearward direction is touched. The steering program 29 outputs a command for moving the vehicle 1 at a predetermined velocity in the left direction while the translation button BBL for translation in the left direction is touched. The steering program 29 outputs a command for moving the vehicle 1 at a predetermined velocity in the right direction while the translation button BBR for translation in the right direction is touched.

The steering program 29 outputs a command for moving the vehicle 1 at a predetermined velocity in the left direction and the forward direction while the translation button BBFL for translation in the left forward direction is touched. The steering program 29 outputs a command for moving the vehicle 1 at a predetermined velocity in the right direction and the forward direction while the translation button BBFR for translation in the right forward direction is touched. The steering program 29 outputs a command for moving the vehicle 1 at a predetermined velocity in the left direction and the rearward direction while the translation button BBBL for translation in the left rearward direction is touched. The steering program 29 outputs a command for moving the vehicle 1 at a predetermined velocity in the right direction and the rearward direction while the translation button BBBR for translation in the right rearward direction is touched.

The control device 21 then controls the electric motors 8a and 8b and 17 according to these commands so that the vehicle 1 moves in accordance with the commands.

By thus merely touching the buttons, the occupant can translate the vehicle 1 at a predetermined velocity in a direction in which the occupant desires to move. When the vehicle 1 is operated by sliding the first pointer 27c or the second pointer 27e, fine adjustment of the position of the vehicle 1 is generally difficult. However, in the case where the vehicle 1 is controlled to be translated at a predetermined velocity when a translation button as shown in FIG. 19 is touched, the occupant can finely adjust the position of the vehicle 1 by merely performing touch operation, and thus the operability of the operating device can be improved.

In other words, the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. An inverted pendulum vehicle including at least a first moving operation unit operable to move on a floor surface, a first actuator device for driving the first moving operation unit, a base assembled with the first moving operation unit and the first actuator device, and an occupant boarding member assembled to the base so as to be tiltable with respect to a vertical direction, the first moving operation unit being configured to move on the floor in all directions including a forward-rearward direction and a left-right direction of an occupant boarded on the occupant boarding member by a driving force of the first actuator device, the inverted pendulum vehicle comprising:
    a second moving operation unit coupled to one of the first moving operation unit and the base such that an interval is formed between the second moving operation unit and the first moving operation unit in the forward-rearward direction, said second moving operation unit being configured to move on the floor surface in all the directions;
    a second actuator device for generating a driving force for making at least the second moving operation unit move in the left-right direction;
    an operating device for outputting a command to move the inverted pendulum vehicle according to an operation by the occupant boarded on the occupant boarding member;
    a notifying section for notifying information on movement of the occupant boarding member, the information including either one of an angle of inclination of the inverted pendulum vehicle or a center of gravity of a combination of the inverted pendulum vehicle and the occupant boarded on the occupant boarding member, to the occupant boarded on the occupant boarding member; and
    a control device for controlling the first actuator device and the second actuator device so as to move the inverted pendulum vehicle according to the command output from the operating device and tilting of the occupant boarding member, wherein the information notified by the notifying section is displayed in each of a first situation which is the inverted pendulum vehicle being moved according to the command output from the operating device, and a second situation which is the inverted pendulum vehicle being moved according to tilting of the occupant boarding member.

2. The inverted pendulum vehicle according to claim 1, wherein:
the operation by the occupant boarded on the occupant boarding member includes a first operation for at least turning the inverted pendulum vehicle and a second operation for at least moving the inverted pendulum vehicle in the left-right direction;
the operating device outputs a command for at least turning the inverted pendulum vehicle in response to the first operation when the first operation is performed; and
the operating device outputs a command for at least moving the inverted pendulum vehicle in the left-right direction in response to the second operation when the second operation is performed.

3. The inverted pendulum vehicle according to claim 2, wherein when the first operation and the second operation are performed simultaneously, the operating device outputs the command corresponding to one of the operations, and does not output the command corresponding to the other operation.

4. The inverted pendulum vehicle according to claim 2, wherein the control device controls the first actuator device and the second actuator device so as not to cause turning behavior of the inverted pendulum vehicle while the second operation of the operating device is performed.

5. The inverted pendulum vehicle according to claim 1, wherein the notifying section is a display device for displaying the information on movement of the occupant boarding member.

6. The inverted pendulum vehicle according to claim 1, wherein the notifying section is provided on the operating device.

7. The inverted pendulum vehicle according to claim 1, wherein the operating device is configured to obtain a program for generating the command in response to the operation from an external server storing the program by communicating with the server.

8. The inverted pendulum vehicle according to claim 1, wherein the operating device is configured to selectively perform processing in a plurality of kinds of forms for generating the command.

9. The inverted pendulum vehicle according to claim 1, wherein the operating device is a portable terminal.

10. The inverted pendulum vehicle according to claim 1, wherein the information on movement of the occupant boarding member is an angle of inclination of the inverted pendulum vehicle.

11. The inverted pendulum vehicle according to claim 1, wherein the information on movement of the occupant boarding member is a center of gravity of a combination of the inverted pendulum vehicle and the occupant boarded on the occupant boarding member.

12. The inverted pendulum vehicle according to claim 1, wherein the operating device is connected to the control device by wire.

13. The inverted pendulum vehicle according to claim 1, wherein the operating device is connected to the control device by radio.

14. The inverted pendulum vehicle according to claim 1, wherein when the operating device has continued being operated for a predetermined time period or more, the operating device starts to output the command to the control device, and notifies the occupant boarded on the occupant boarding member of the starting of the output of the command.

15. The inverted pendulum vehicle according to claim 1, wherein the operating device has a predetermined function different from a function of outputting the command, and when the predetermined function is enabled while the command is output according to the operation of the operating device, so that the operating device becomes unable to receive the operation, the operating device stops the output of the command.

16. The inverted pendulum vehicle according to claim 1, wherein the operating device includes a touch panel having an operating region to be touched, and when the operating region is changed from a state of not being touched to a state of being touched, and a point being touched is a predetermined position, the output of the command from the operating device to the control device is started, and the occupant boarded on the occupant boarding member is notified of the starting of the output of the command.

17. The inverted pendulum vehicle according to claim 1, wherein the operating device includes a touch panel having an operating region to be operated by slide operation, and a reference point as a point changed from a state of not being touched to a state of being touched in the operating region to perform slide operation in the operating region being set as a reference, the operating device generates the command according to a change from the reference point to an operation point as a point after the slide operation is performed.

18. An inverted pendulum vehicle, comprising
a first moving operation unit operable to move on a floor surface,
a first motor for driving the first moving operation unit,
a base assembled with the first moving operation unit and the first motor, and
a seat assembled to the base so as to be tiltable with respect to a vertical direction;
a second moving operation unit coupled to the first moving operation unit, and being configured to be movable on the floor surface;
a second motor for generating a driving force for the second moving operation unit;
an operating device for outputting a command to move the inverted pendulum vehicle according to an operation by an occupant occupying the seat;
a notifying section for notifying information on movement of the seat, the information including either one of an angle of inclination of the inverted pendulum vehicle or a center of gravity of a combination of the inverted pendulum vehicle and the occupant boarded on the seat, to the occupant; and
a control device for controlling the first and second motors so as to move the inverted pendulum vehicle according to the command output from the operating device and tilting of the seat,
wherein the information notified by the notifying section is displayed in each of a first situation which is the inverted pendulum vehicle being moved according to the command output from the operating device, and a second situation which is the inverted pendulum vehicle being moved according to tilting of the seat.

19. An inverted pendulum vehicle, comprising
a first moving operation unit and a second moving operation unit operatively attached with said first moving operation unit, each of said first moving operation unit and said second moving operation unit being operable to move on a floor surface in all directions;
a first motor and a second motor for driving the first moving operation unit and the second moving operation unit, respectively;
a base assembled with the first moving operation unit;
a seat attached to the base;
a portable terminal device for outputting a command to move the inverted pendulum vehicle according to an operation by an occupant occupying the seat;
a display device for displaying information on movement of the seat, the information including either one of an angle of inclination of the inverted pendulum vehicle or a center of gravity of a combination of the inverted pendulum vehicle and the occupant boarded on the seat, to the occupant; and
a control device for controlling the first and second motors so as to move the inverted pendulum vehicle according to the command output from the portable terminal device,
wherein the information is displayed by the display device in each of a first situation which is the inverted pendulum vehicle being moved according to the command output from the portable terminal device, and a second situation which is the inverted pendulum vehicle being moved according to tilting of the seat.

20. The inverted pendulum vehicle according to claim 19, wherein the operation by the occupant includes a first operation for at least turning the inverted pendulum vehicle and a second operation for at least moving the inverted pendulum vehicle in the left-right direction.

* * * * *